United States Patent [19]

Fukunaga

[11] Patent Number: 4,792,919

[45] Date of Patent: Dec. 20, 1988

[54] WORD PROCESSOR

[75] Inventor: Kouji Fukunaga, Tokyo, Japan

[73] Assignee: Canon Kabushiki Kaisha, Tokyo, Japan

[21] Appl. No.: 124,368

[22] Filed: Nov. 23, 1987

Related U.S. Application Data

[63] Continuation of Ser. No. 625,824, Jun. 28, 1984, abandoned.

[30] Foreign Application Priority Data

Jul. 1, 1983 [JP] Japan .............................. 58-118115
Jul. 1, 1983 [JP] Japan .............................. 58-118116

[51] Int. Cl.$^4$ ............................................. G06B 9/00
[52] U.S. Cl. ................................................ 364/900
[58] Field of Search ............................... 364/200, 900

[56] References Cited

U.S. PATENT DOCUMENTS 4,370,707  1/1983  Phillips et al. ....................... 364/200

OTHER PUBLICATIONS

Bove et al., "Overview and Tutorial ... Word Processing Tools for Writers" Users Guide to CP/M Systems and Software, vol. 1, No. 3, Mar. 83, pp. 38-41, 44, 45.

Primary Examiner—Gareth D. Shaw
Assistant Examiner—John G. Mills
Attorney, Agent, or Firm—Fitzpatrick, Cella, Harper & Scinto

[57] ABSTRACT

A word processor comprises a keyboard for inputting characters, a text compiling unit for compiling a text by the characters inputted from the keyboard, a memory for storing the text compiled by the text compiling unit, a designation unit for designating ends of chapters or phrases of the text when the text is compiled by the text compiling unit, and a table of contents compiling unit for compiling a table of contents corresponding to the chapters or the paragraphs of the text in accordance with the designation of the ends of the chapters or the paragraphs by the designation unit.

15 Claims, 36 Drawing Sheets

F I G. 7
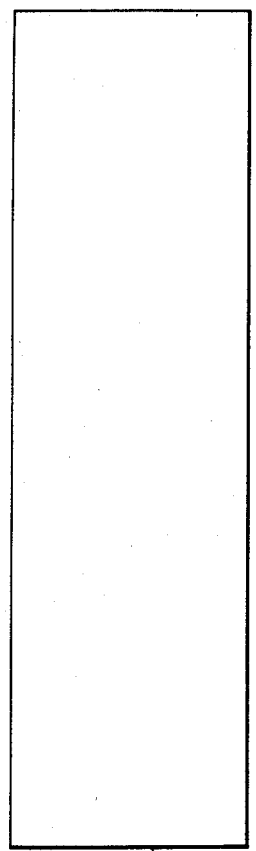
IPBUF
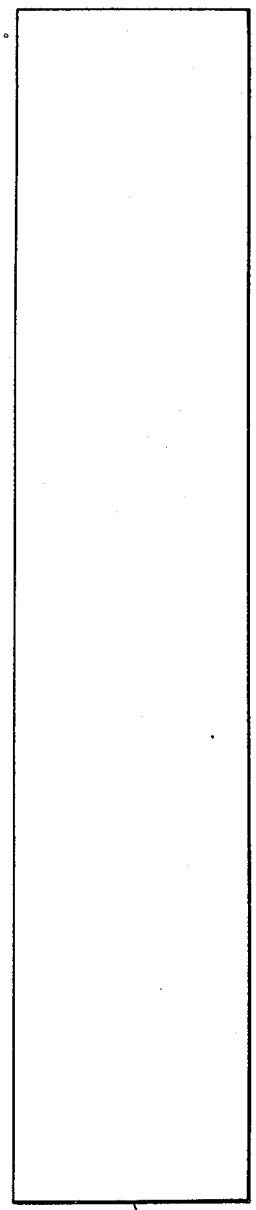
DBUF

TABLE OF
CONTENTS

○○○  ○○○○○      ○○
 ↑       ↑            ↑
CHAPTER NO. TITLE   PAGE

FIG. 14

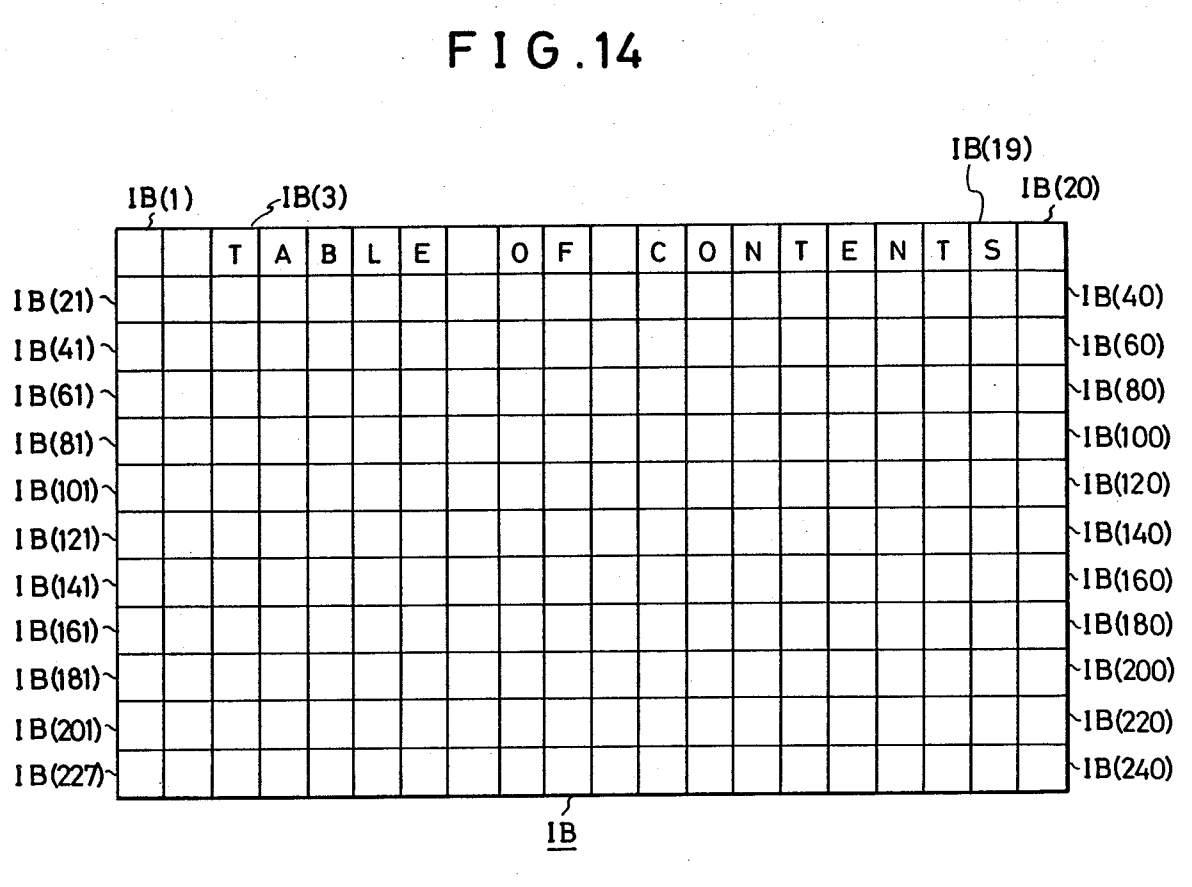

| IB(1) | T | A | B | L | E | | O | F | | C | O | N | T | E | N | T | S | | | |
|---|---|---|---|---|---|---|---|---|---|---|---|---|---|---|---|---|---|---|---|---|
| | | | | | | | | | | | | | | | | | IB(19) | IB(20) | | IB(40) |
| IB(21) | | | | | | | | | | | | | | | | | | | | IB(60) |
| IB(41) | | | | | | | | | | | | | | | | | | | | IB(80) |
| IB(61) | | | | | | | | | | | | | | | | | | | | IB(100) |
| IB(81) | | | | | | | | | | | | | | | | | | | | IB(120) |
| IB(101) | | | | | | | | | | | | | | | | | | | | IB(140) |
| IB(121) | | | | | | | | | | | | | | | | | | | | IB(160) |
| IB(141) | | | | | | | | | | | | | | | | | | | | IB(180) |
| IB(161) | | | | | | | | | | | | | | | | | | | | IB(200) |
| IB(181) | | | | | | | | | | | | | | | | | | | | IB(220) |
| IB(201) | | | | | | | | | | | | | | | | | | | | IB(240) |
| IB(227) | | | | | | | | | | | | | | | | | | | | |

IB

F I G. 15

| TABLE OF CONTENTS | | |
|---|---|---|
| CHAPTER 1 | PREFACE | 1 |
| CHAPTER 2 | GENERAL | 2 |
| CHAPTER 3 | HOW TO OPERATE | 5 |
| CHAPTER 4 | NOTES | 10 |
| CHAPTER 5 | CLOSING | 12 |

FIG.16

| | T | A | B | L | E | | O | F | | C | O | N | T | E | N | T | S | | |
|---|---|---|---|---|---|---|---|---|---|---|---|---|---|---|---|---|---|---|---|
| | | | | | | | | | | | | | | | | | | | |
| | 第 | 1 | 章 | は | じ | め | に | | | | | | 1 | | | | | | |
| | 第 | 2 | 章 | 概 | 要 | | | | | | | | 2 | | | | | | |
| | 第 | 3 | 章 | 操 | 作 | 法 | | | | | | | 5 | | | | | | |
| | 第 | 4 | 章 | 注 | 意 | 点 | | | | | | | 1 | 0 | | | | | |
| | 第 | 5 | 章 | お | わ | り | | | | | | | 1 | 2 | | | | | |

FIG.18

| | T | A | B | L | E | | O | F | | C | O | N | T | E | N | T | S | | | |
|---|---|---|---|---|---|---|---|---|---|---|---|---|---|---|---|---|---|---|---|---|
| 第 | 1 | 章 | | | は | じ | め | に | | | | 1 | | | | | | | | |
| | | | | | | | | | | | | | | | | | | | | |
| | | | | | | | | | | | | | | | | | | | | |
| | | | | | | | | | | | | | | | | | | | | |
| | | | | | | | | | | | | | | | | | | | | |
| | | | | | | | | | | | | | | | | | | | | |
| | | | | | | | | | | | | | | | | | | | | |
| | | | | | | | | | | | | | | | | | | | | |
| | | | | | | | | | | | | | | | | | | | | |
| | | | | | | | | | | | | | | | | | | | | |
| | | | | | | | | | | | | | | | | | | | | |

FIG.20

| TABLE OF CONTENTS | | |
|---|---|---|
| CHAPTER 1 | PREAFCE | 1 |
| CHAPTER 2 | GENERAL | 3 |
| CHAPTER 3 | HOW TO OPERATE | 6 |
| CHAPTER 4 | CLOSING | 11 |

FIG. 21

| | T | A | B | L | E | | O | F | | C | O | N | T | E | N | T | S | |
|---|---|---|---|---|---|---|---|---|---|---|---|---|---|---|---|---|---|---|
| | 第 | 1 | 章 | | はじめに | | | | | | | | | | 1 | | | |
| | 第 | 2 | 章 | | 概要 | | | | | | | | | | 3 | | | |
| | 第 | 3 | 章 | | 操作法 | | | | | | | | | | 6 | | | |
| | 第 | 4 | 章 | | おわり | | | | | | | | | 1 | 1 | | | |

IB(1), IB(3), IB(19), IB(20), IB(21), IB(40), IB(41), IB(60), IB(61), IB(80), IB(81), IB(100), IB(101), IB(120), IB(121), IB(140), IB(141), IB(160), IB(161), IB(180), IB(181), IB(200), IB(201), IB(220), IB(227), IB(240)

1B

WORD PROCESSOR

This application is a continuation of application Ser. No. 625,824 filed June 28, 1984 now abandoned.

BACKGROUND OF THE INVENTION

1. Field of the Invention

The present invention relates to a word processor, and more particularly to a word processor which can readily compile and edit a table of contents of a text

2. Description of the Prior Art

In a prior art word processor, a table of contents and a text corresponding to the table of contents have been compiled and edited separately. Accordingly, if the contents of the text are corrected or modified, there is no function to automatically change the table of contents and the table of contents must be manually corrected or modified separately.

SUMMARY OF THE INVENTION

It is an object of the present invention to provide a word processor which automatically compiles a table of contents in accordance with the contents of a text edited and compiled.

It is another object of the present invention to provide a word processor which automatically corrects or modifies a table of contents in accordance with and in correspondence to correction or modification of the contents of a text.

It is another object of the present invention to provide a word processor comprising:
- input means for inputting characters;
- text and table of contents compiling means for compiling a text by the characters input from the input means and compiling a table of contents in accordance with the text;
- memory means for storing the text and the table of contents compiled by the text and table of contents compiling means; and
- correction means for correcting the table of contents when the text stored in the memory means is corrected or edited.

It is another object of the present invention to provide a word processor comprising:
- input means for inputting characters;
- text compiling means for compiling a text by the characters input from the input means;
- memory means for storing the text compiled by the sentence compiling means;
- designation means for designating ends of chapters or paragraphs of the text in compiling the text by the text compiling means; and
- table of contents compiling means for compiling a table of contents for the chapters or the paragraphs of the text in accordance with the designation of the ends of the chapters or the paragraphs by the designation means.

BRIEF DESCRIPTION OF THE DRAWINGS

FIG. 7 shows a configuration of a text buffer DBUF and a table of contents information buffer IPBUF of FIG. 2, FIGS. 8 ahd 9 show the text of FIG. 6 stored in the text buffer DBUF of FIG. 7.

FIG. 13 shows a basic format of a table of contents outputted by the printer PRT of FIG. 1, FIG. 14 shows an example of the table of contents compiled in the table of contents buffer IB of FIG. 3, FIG. 15 shows an example of the table of contents outputted by the printer PRT of FIG. 1 after the compilation of the table of contents, FIG. 16 shows an example of the content of the table of contents buffer IB of FIG. 3 after the compilation of the table of contents, FIG. 18 shows an example of the content of the table of contents buffer IB of FIG. 3 during the compilation of the table of contents, FIG. 20 shows an example of the corrected or modified table of contents outputted by the printer PRT of FIG. 1, FIG. 21 shows an example of the contents of the table of contents buffer IB of FIG. 16 after the correction or modification.

DETAILED DESCRIPTION OF THE PREFERRED EMBODIMENTS

Figure 1:
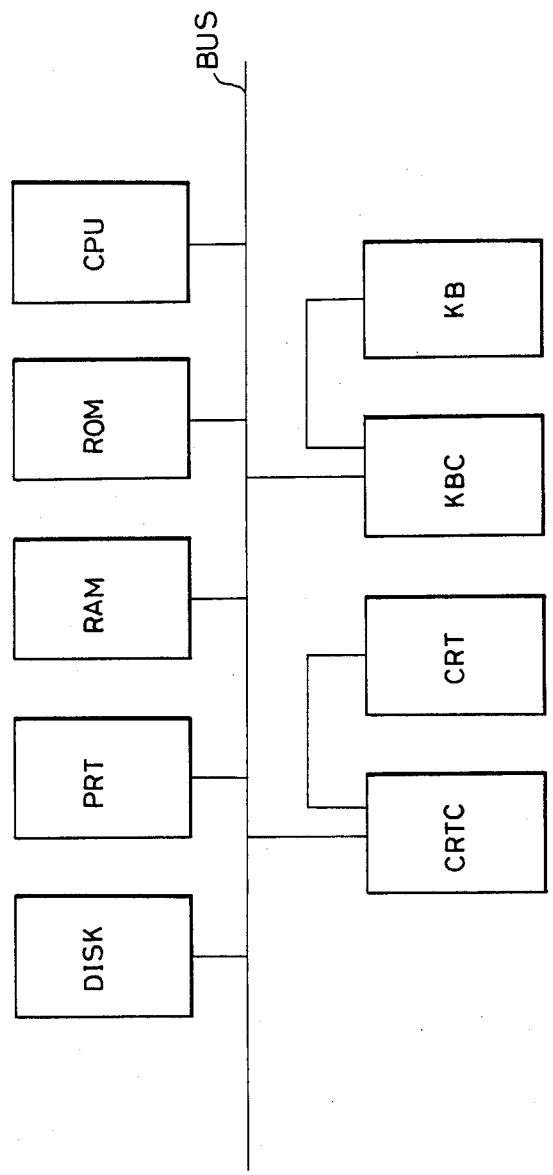
FIG. 1 is a block diagram of a configuration of a word processor of the present invention.

FIG. 1 shows a configuration of the word processor of the present invention. CPU denotes a microprocessor which carries out arithmetic operations and logical operations as a central processing unit and controls various elements through a bus BUS. The bus BUS comprises a data bus, a control bus and an address bus. KB denotes a keyboard on which character and function keys for issuing commands to the microprocessor CPU are arranged. KBC denotes a controller for the keyboard KB, which processes input signals from the keyboard KB. ROM denotes a read-only memory which stores control procedures for the input characters and editing. CRT denotes a CRT display which displays compiled and edited sentences and a table of contents. CRTC denotes a CRT controller. The display CRT is controlled by the controller CRTC to display the text and the table of contents. PRT denotes a printer such as an ink jet printer which prints out the compiled text on a record paper. DISK denotes a disk (disk memory) such as a floppy disk or an optical disk which stores the compiled text. RAM denotes a writable random access memory which includes a temporary memory buffer for the compiled and edited text, a temporary memory buffer for the table of contents data and registers for compiling the table of contents and the table of contents data.

Figure 2:
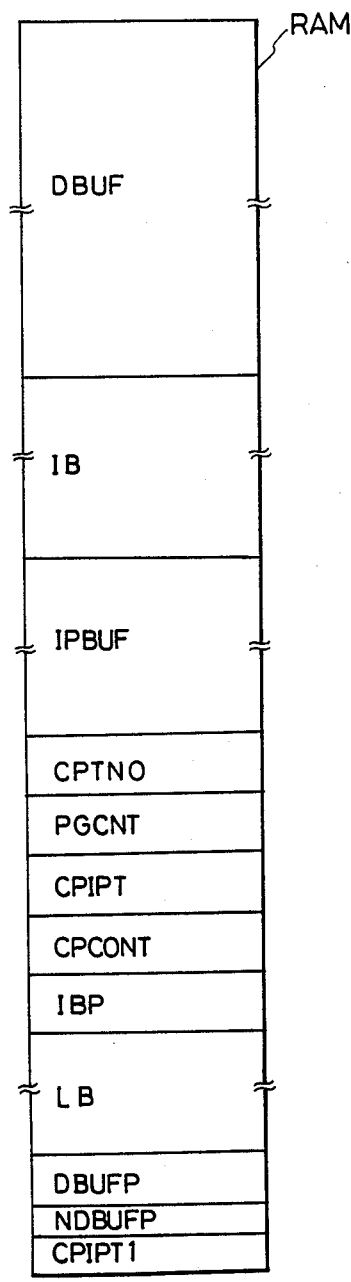
FIG. 2 shows a detailed configuration of a random access memory (RAM) of FIG. 1.

FIG. 2 shows a detailed configuration of the random access memory RAM of FIG. 1. DBUF denotes a text compile/edit buffer which stores the text by codes. IB denotes a table of contents buffer which stores the compiled output of the table of contents. IPBUF denotes a buffer which stores table of contents information of the chapters when the text is compiled and edited. The table of contents in the table of contents buffer IB is compiled in accordance with the table of contents informatinn of the chapters in the buffer IPBUF. PGCNT denotes a register which stores the number of pages of the chapter. CPCONT denotes a eegister which indicates a chapter number being compiled and edited. CPIPT denotes a register which indicates the number of table of contents information tables in the buffer IPBUF being processed. CPTNO denotes a register which indicates a total number of pages of the chapters counted from the first chapter. It is used when the table of contents is compiled. IBP denotes a register which indicates an address of the buffer IB when one line of table of contents is loaded in the table of contents buffer IB. LB denotes a table of contents one-line buffer which contains one line of characters which is used as the contents of the table of contents when the table of contents is compiled. DBUFP denotes a text buffer pointer which points to an address of the text buffer DBUF at which a character code is to be stored in accordance with a key input from the keyboard KB. The content of the pointer DBUFP is incremented by one each time one character is stored in the buffer DBUF. NDBUFP denotes a register which indicates a start position in the text buffer DBUF for the next chapter to the chapter currently being processed. CPIPT1 denotes a similar register to the register CPIPT and it is temporarily used in place of the register CPIPT.

Figure 3:
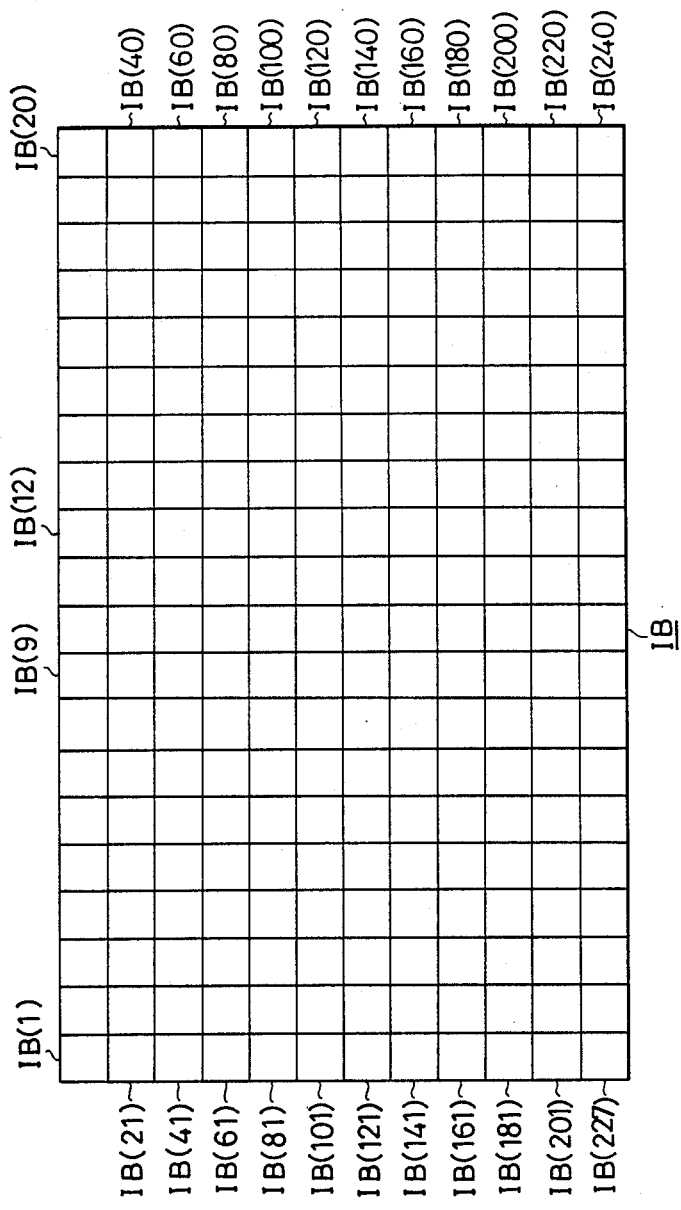
FIG. 3 shows a configuration of a table of contents buffer IB of FIG. 2.

FIG. 3 shows a detailed configuration of the table of contents buffer IB of FIG. 2. As shown in FIG. 3, the buffer IB is a buffer memory which can store up to 240 character codes at addresses IB(1)-(240). A character code such as a JIS code is stored in each buffer area. By displaying the contents of the table of contents buffer IB on the screen of the display CRT, the table of contents can be reviewed on the screen.

Figure 4:
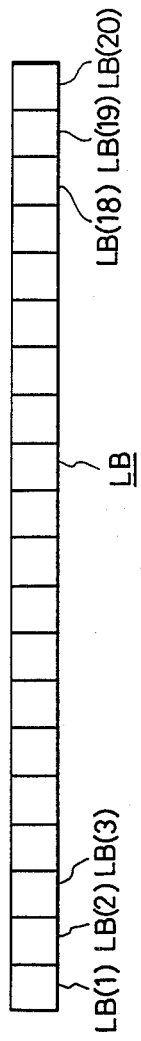
FIG. 4 shows a configuration of a table of contents one-line buffer LB of FIG. 2.

FIG. 4 shows a detailed configuration of the table of contents one-line buffer LB of FIG. 2. As shown in FIG. 4, the buffer LB can store up to 20 character codes at addresses LB(1)-LB(20) and it stores one line (one chapter) of table of contents to be set in the buffer IB. When the table of contents is compiled, one line of table of contents is stored in the table of contents one-line buffer LB in accordance with the contents of the chapter of the table of contents information table in the table of contents data buffer IPBUF.

Figure 5:
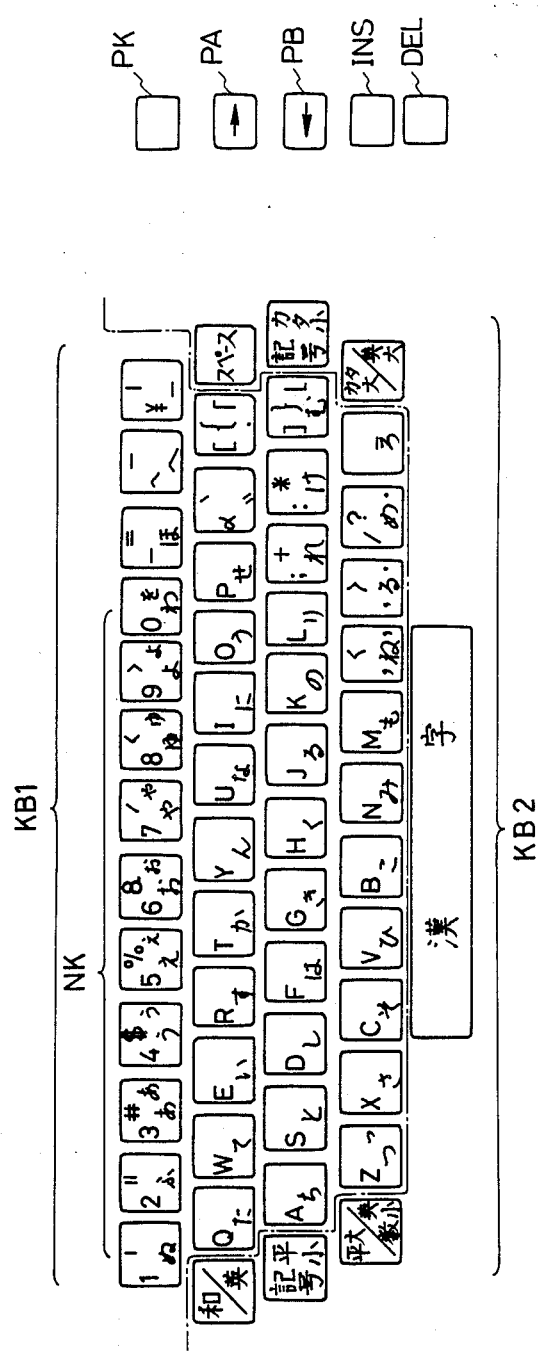
FIG. 5 is a plan view showing an arrangement of a keyboard KB of FIG. 1.

FIG. 5 shows a detailed arrangement of the keys on the keyboard KB of FIG. 1. KB1 denotes data input keys for inputting data such as characters and numerals, KB2 denotes function keys arranged on the keyboard KB, and ED denotes a key for designating start of text compilation. After the key ED has been depressed, the compilation of a new text is permitted. EDE denotes a key for designating end of text compilation. The text compilation function is enabled during a time period from the depression of the key ED to the depression of the key EDE. RE denotes a key for designating reedition. After the key RE has been depressed, the compiled text can be read out for correction or modification. REE denotes a key for designating end of reedition. The text correction/modification function is enabled during a time period between the depression of the key RE and the depression of the key REE.

CPS denotes a key for designating beginning of a chapter. When a chapter begins, the key CPS is depressed and the contents of a new chapter are inputted. CPE denotes a key for designating the end of the chapter. Before the contents of a new chapter are inputted, the key CPE is depressed to designate the end of the previous chapter. The compilation, edition and correction of the chapter is permitted during a period between the depression of the key CPS and the depression of the key CPE. PK denotes a print designation key. After the key PK has been depressed, the printer PRT can execute the print operation.

PA with $\boxed{\rightarrow}$ mark and PB with $\boxed{\leftarrow}$ mark denote pointer shift keys for shifting the pointer DBUFP which points the address of the buffer DBUF at the character position in the text buffer DBUF at which the character is to be corrected duringtthe reedition, to one character backward address or one character forward address, respectively. INS denotes a key for commanding one character insertion at the position in the text buffer DBUF pointed by the buffer pointer DBUFP. DEL denotes a key for commanding one character deletion a the position in the text buffer DBUF pointed by the buffer pointer DBUFP. The keys INS and DEL are ueed in the reedition.

Figure 6:
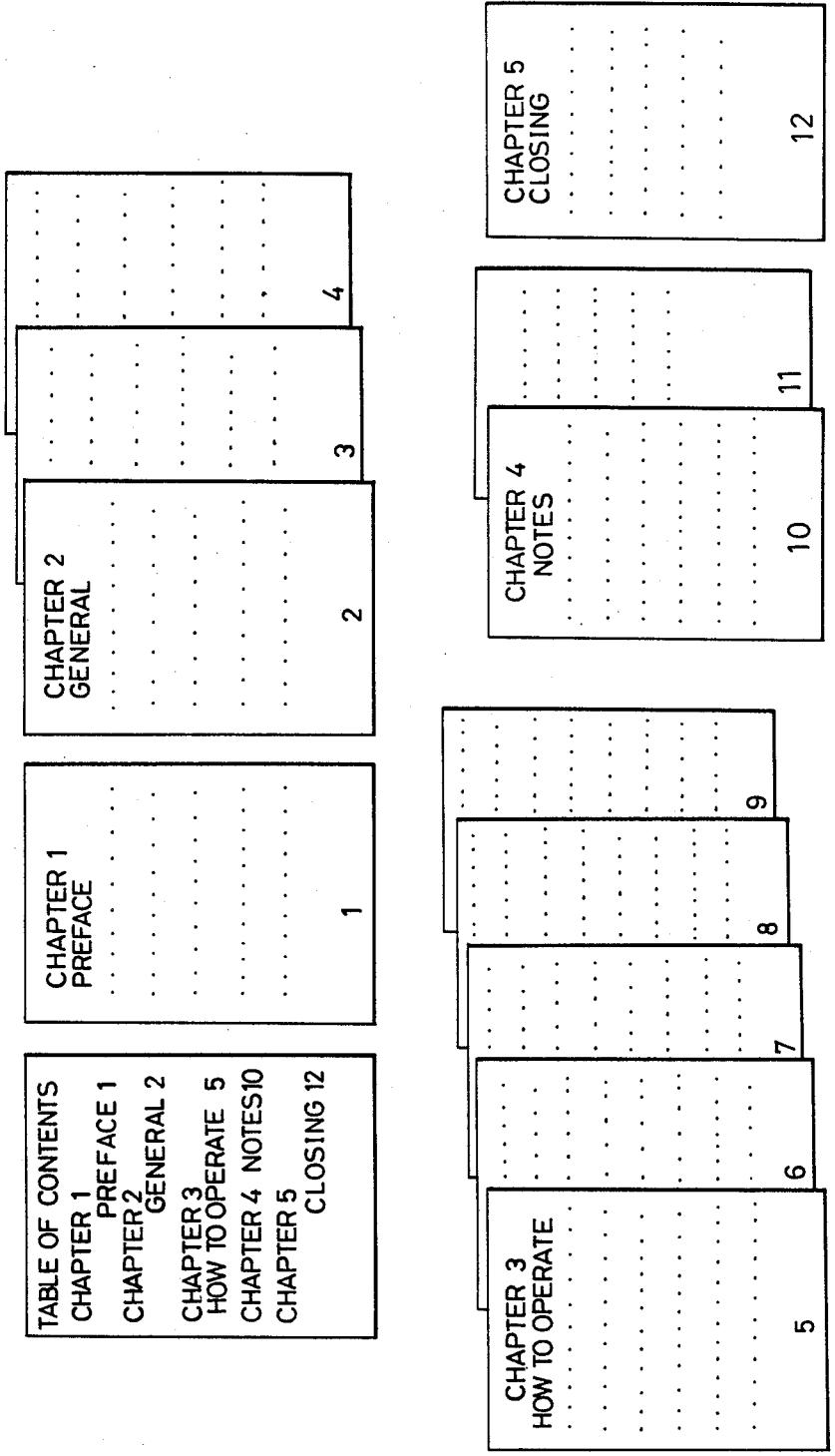
FIG. 6 shows an example of a printout of a text and a table of contents printed by a printer PRT of FIG. 1.

FIG. 6 shows examples of the text and the table of contents corresponding thereto printed out on the record papers by the word processor of FIG. 1. As shown in FIG. 5, the text comprises chapters 1 to 5. The chapter 1 describes "preface" on one page, the chapter 2 describes "general" on three pages, the chapter 3 describes "how to operate" on five pagss, the chapter 4 described "notes" on two pages and the chapter 5 describes "closing" on one page. The following explanation uses the text shown in FIG. 6.

FIG. 7 shows examples of the text buffer DBUF and the table of contents data buffer IPBUF in the random access memory RAM of FIG. 2. The key codes from the keyboard KB are stored in the text buffer DBUF as the text to be later outputted. Information for compiling the table of contents such as chapter numbers, titles of the chapters, pointers for pointing addresses on the buffer DBUF for the chapters and the number of pages are stored in the table of contents data buffer IPBUF.

Figure 8:
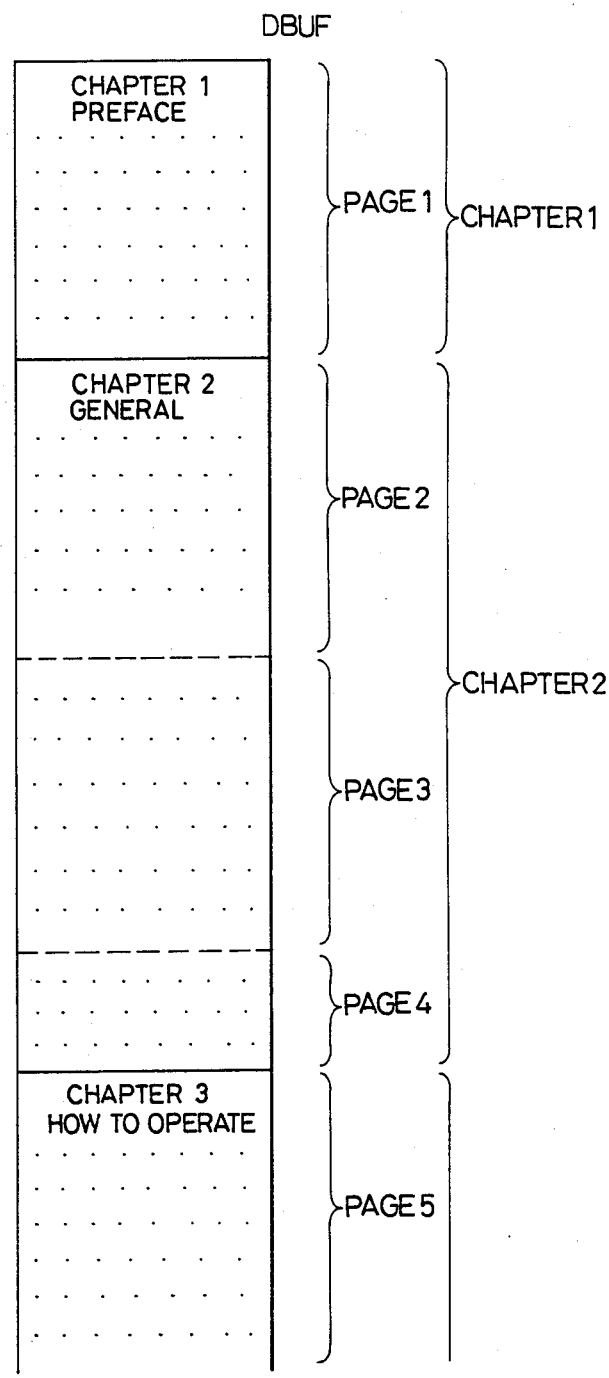
Figure 9:
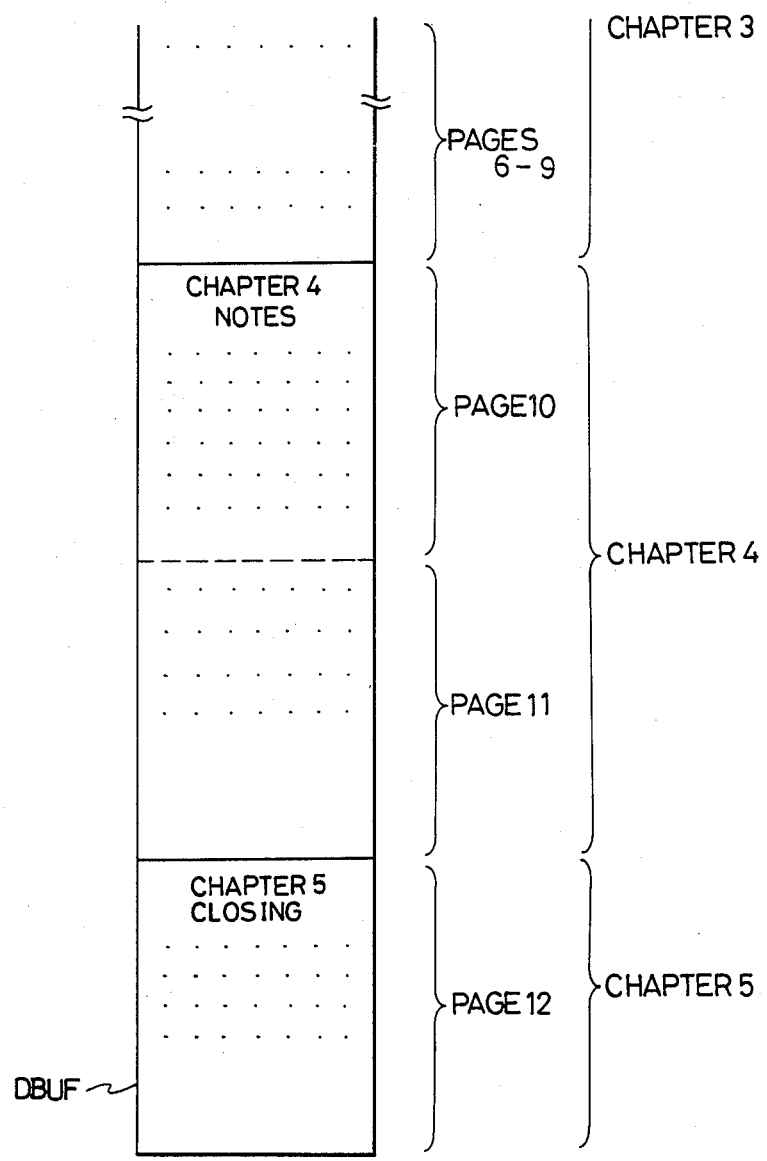

FIGS. 8 and 9 show an example of the text compiled in the text buffer DBUF of FIG. 7, and more particularly the text of FIG. 6 stored in the text buffer DBUF. As shown, the text of the chapters 1-5 is stored in the text buffer DBUF as a series of continuous character codes.

Figure 10A:
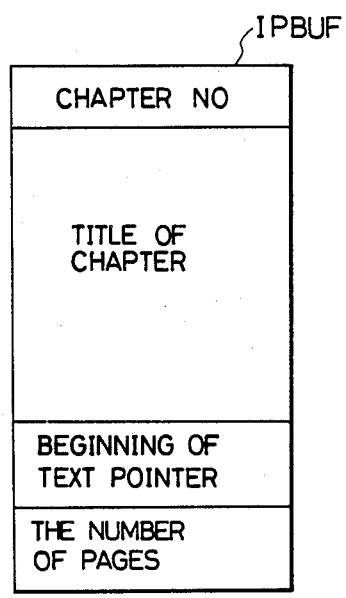
FIG. 10A shows a format of a table of contents information table compiled in the table of contents information buffer IPBUF of FIG. 7.

FIG. 10A shows a detailed data format for the chapters in the table of contents data buffer IPBUF of FIG. 7. The table of contents information table for each chapter compiled is compiled in the table of contents data buffer IPBUF. As shown in FIG. 10A, the table of contents information table contains memory areas for a chapter number, a title of the chapter, a beginning of text pointer and the number of pages. The chapter number is an integer starting with "1". The title of the chapter consists of five character codes which are JIS codes used in the text. The beginning of text pointer points to a start position of the chapter in the text buffer DBUF. It contains an address of the buffer memory DBUF to identify the start position of the chapter on the bffer DBUF. The number of pages indicates the number of pages in the chapter. It is an integer no smaller than one.

Figure 10B:
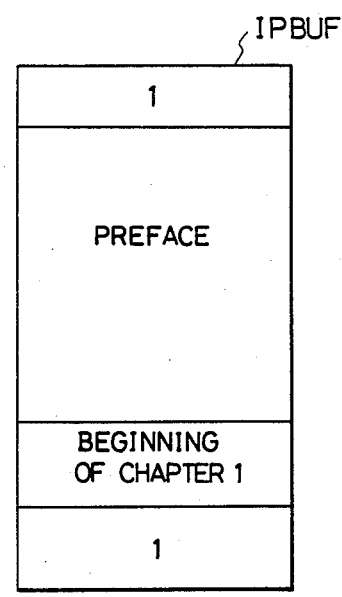
FIG. 10B shows an example of a content of the table of contents information table of FIG. 10A.

An example of the stored table of contents information table is shown in FIG. 10B. It shows the table of contents information table for the chapter 1 of the text shown in FIG. 6. The chapter number is "1", the title of the chapter contains seven character codes for "Preface", the beginning of text pointer points to the start point of the chapter 1, that is, the start address of the text buffer DBUF of FIG. 8. The number of pages is "1".

Figure 11:
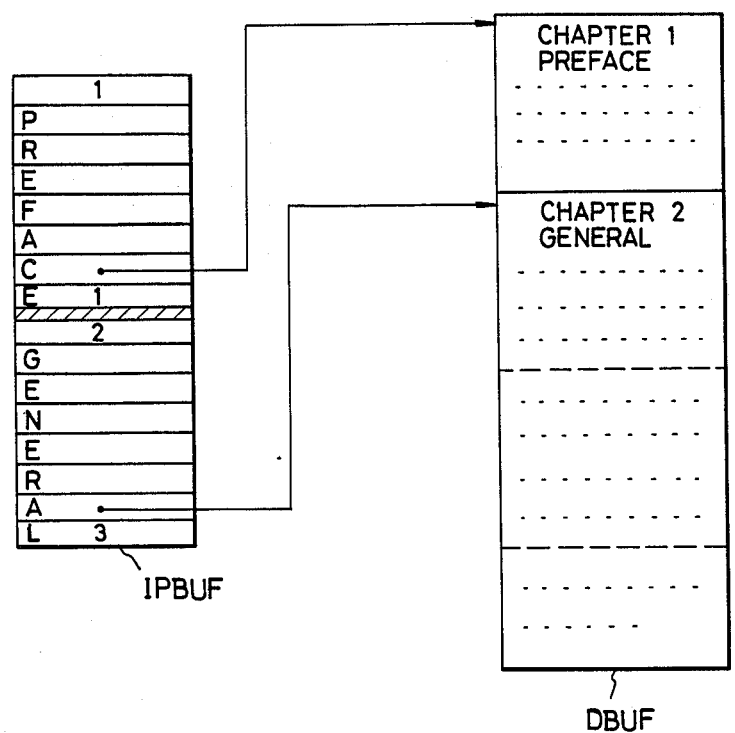
FIG. 11 shows examples of contents of the text buffer DBUF and the table of contents information buffer IPBUF of FIG. 7 during the compilation of the text.

FIG. 11 shows a manner of compilation of the table of contents information table of FIG. 10B as the text is compiled in the text buffer DBUF shown in FIGS. 8 and 9. In FIG. 11, the chapters 1 and 2 have been compiled and the table of contents information tables for the chapters 1 and 2 have been compiled.

Figure 12:
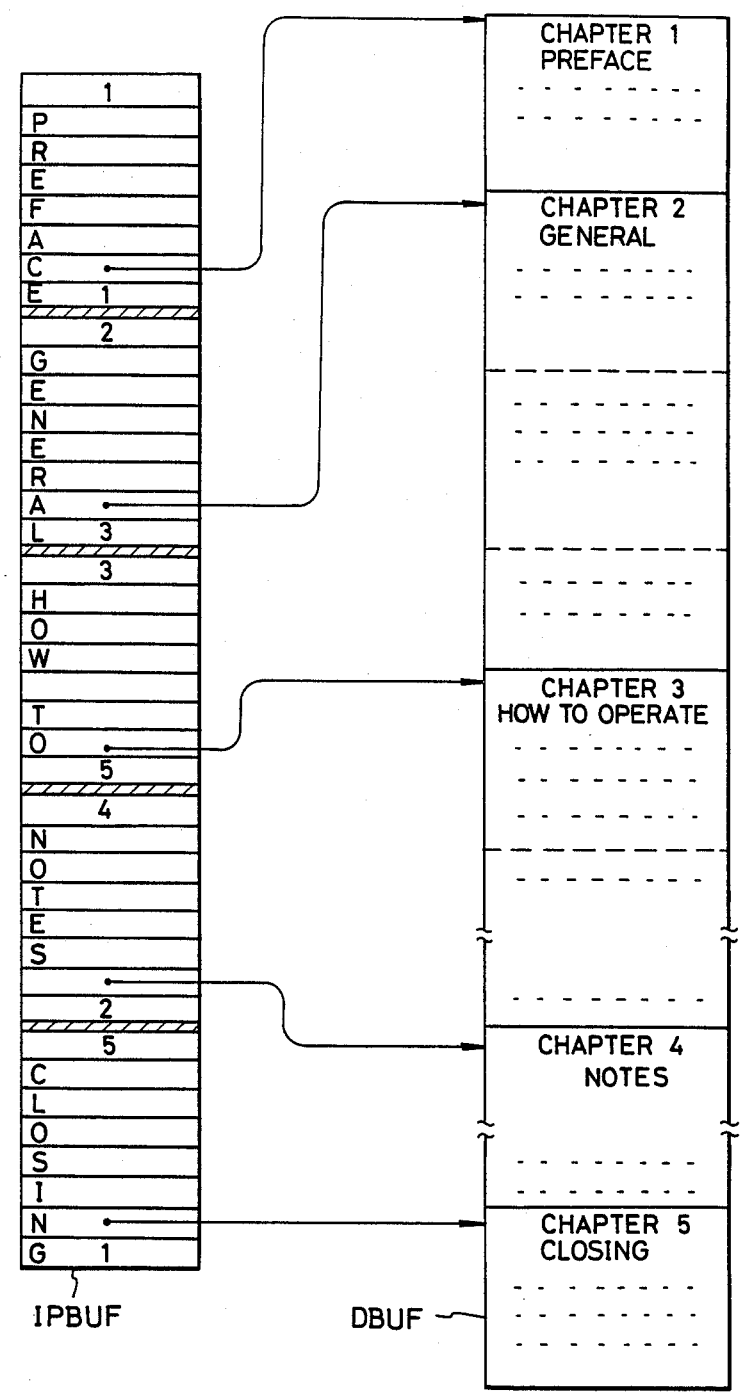
FIG. 12 shows examples of contents of the text buffer DBUF and the table of contents information buffer IPBUF of FIG. 7 after the compilation of the text, H.

FIG. 12 shows the text in the text buffer DBUF and the table of contents information table in the table of contents data buffer IPBUF after the text has been compiled.

FIG. 13 shows an example of a basic format of the table of contents compiled in the table of contents buffer IB after the text has been compiled in the text buffer DBUF and the table of contents information tables for all chapters have been compiled in the table of contents data buffer IPBUF. In the table of contents buffer IB, character codes for "Table of Contents" are stored in the first line, and the chapter number, the title of the chapter and the number of pages are stored in one line for each chapter.

FIG. 14 shows an example of the table of contents basic format in the table of contents buffer IB of FIG. 3. In the table of contents buffer IB, character codes corresponding to "Table of Contents" are stored at addresses IB(3)-IB(19). The table of contents compiled in the present example includes the chapter number, the title of the chapter and the number of pages for each chapter on the table of contents basic format at the positions corresponding to the respective chapters in the buffer IB. The table of contents for the chapter 1 is stored in the addresses IB(41)-IB(60), and the table of contents for other chapters are stored in the addresses IB(81)-IB(100), IB(121)-IB(140), IB(161)-IB(180) and IB(201)-IB(220).

FIG. 15 shows the table of contents compiled by the table of contents compiling process after the text shown in FIG. 6 has been compiled in the text buffer DBUF.

FIG. 16 shows the character codes stored in the table of contents buffer IB. At the end of the compilation of the table of contents, the character codes as shown in FIG. 16 have been stored at the corresponding address of the table of contents buffer IB.

Figure 17:
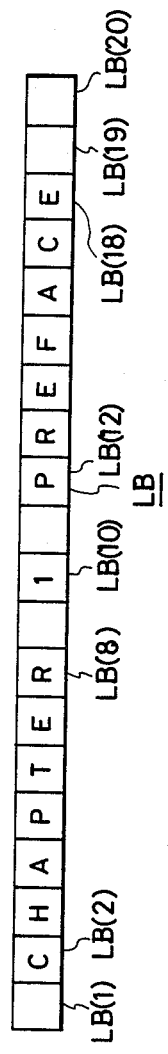
FIG. 17 shows an example of the content of the table of contents one-line buffer LB of FIG. 4 during the compilation of the table of contents.

FIG. 17 shows the table of contents for one chapter compiled in the table of contents compiling process and stored in the one-line table of contents buffer LB. The content of the table of contents compiled is stored in the table of contents one-line buffer LB for each line for each chapter at one time. Each time one line of table of contents information is stored in the table of contents one-line buffer LB, the content thereof is transferred to the table of contents buffer IB. FIG. 17 shows the content of the one-line table of contents buffer LB for the chapter 1 of the text.

Figure 18:
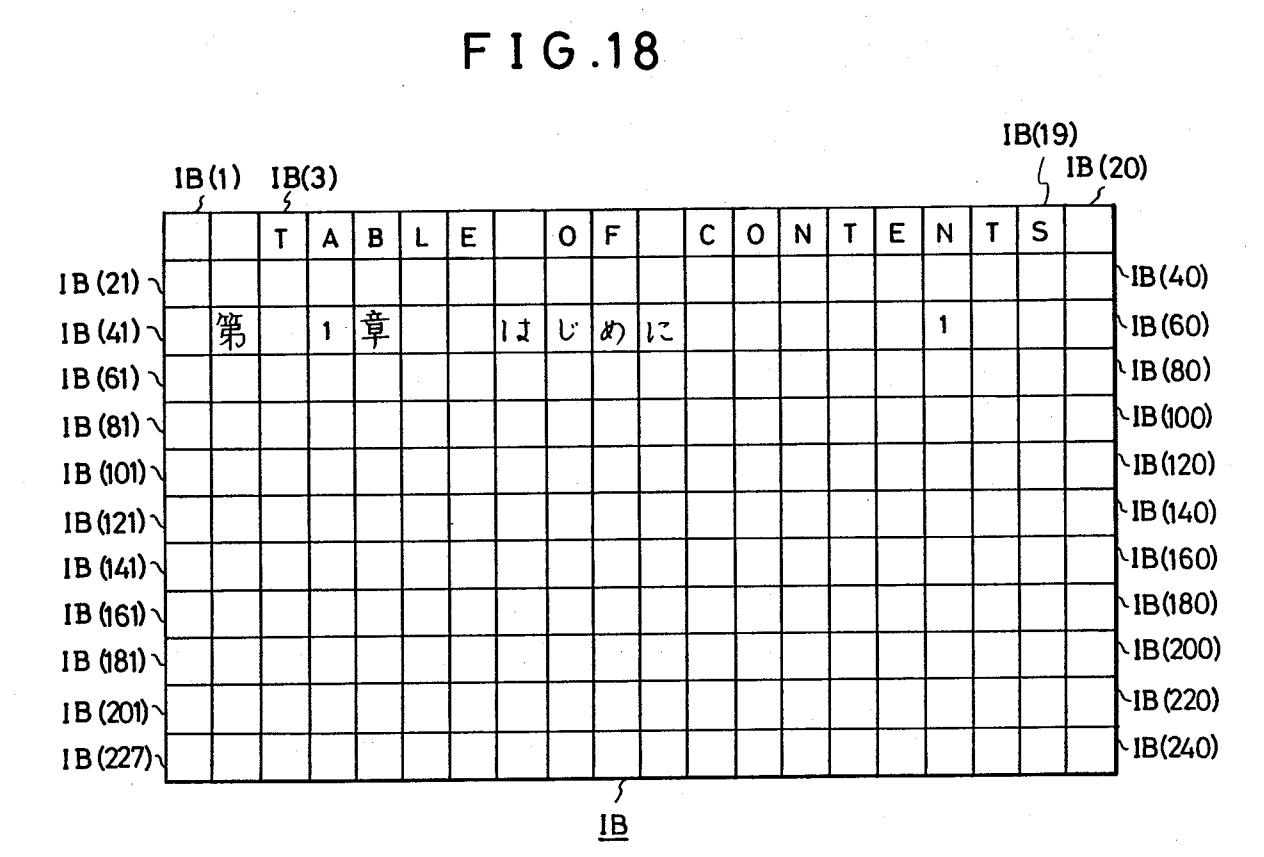

FIG. 18 shows the content of the table of contents for one chapter shown in FIG. 17 transferred from the table of contents one-line buffer LB to the table of contents buffer IB to compile the table of contents for the chapter 1.

Figure 19:
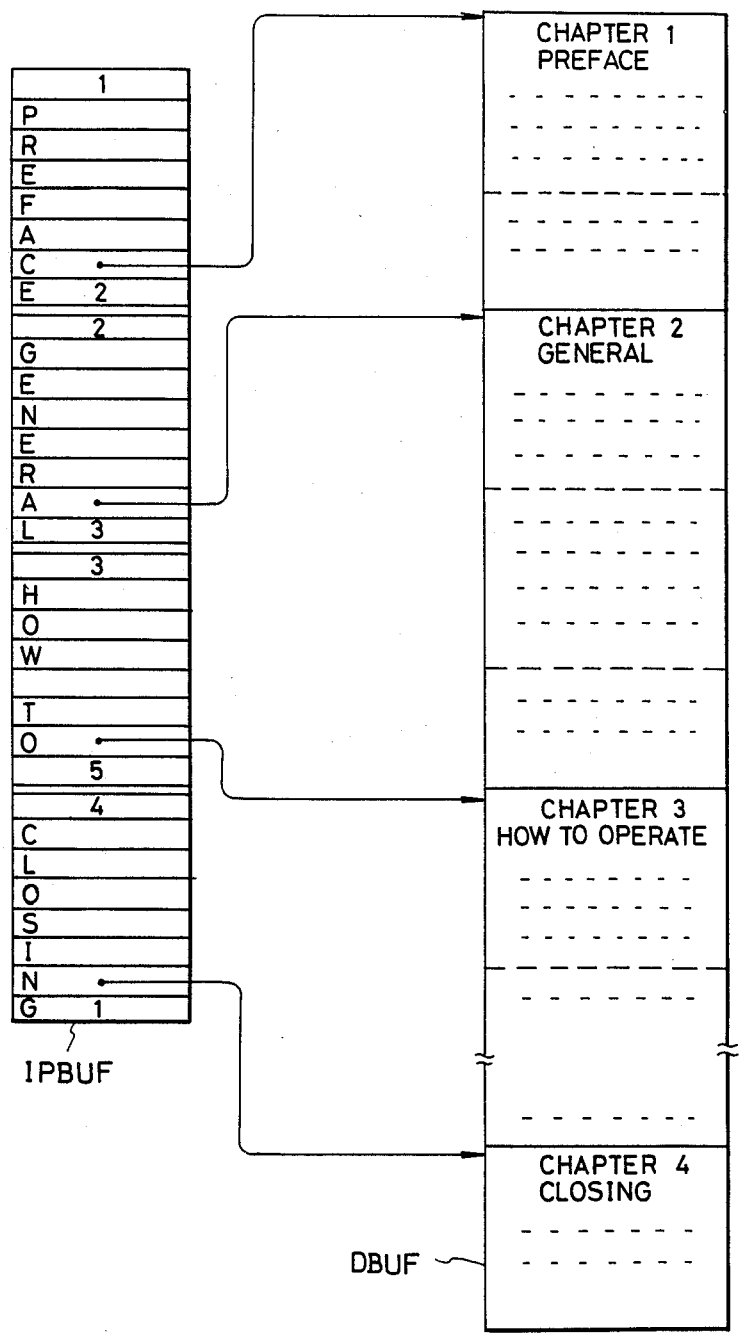
FIG. 19 shows examples of the contents of the text buffer DBUF and the table of contents information table IPBUF of FIG. 12 after the correction or modification.

FIG. 19 shows an example of the content of the text in the text buffer DBUF after the correction of the text and an example of the content of the table of contents information table in the table of contents data buffer IPBUF. The text and the table of contents information table shown in FIG. 12 are compared with those of FIG. 19. In FIG. 12, the chapter 1 comprises only one page while in FIG. 19 the chapter 1 contains two pages because of the correction of the text. In FIG. 12, the chapter 4 is "Notes" but in FIG. 19, the chapter 4 is deleted and the former chapter 5 is changed to the chapter 4.

FIG. 20 shows the table of contents after it has been changed in accordance with the corrected text shown in FIG. 19 and the table of contents information table. The correction in the text is automatically reflected in the table of contents so that the table of contents corresponds to the current contents of the text.

FIG. 21 shows the table of contents of FIG. 20 stored in the table of contents buffer IB.

Figure 22:
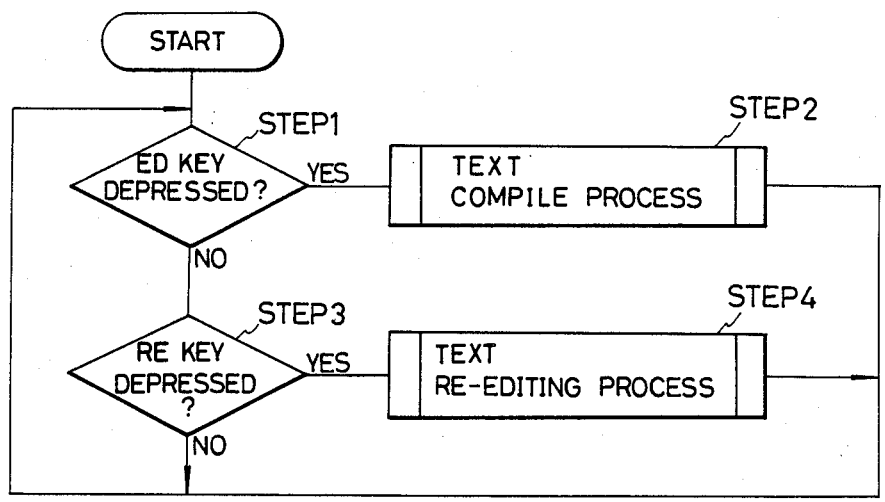
FIGS. 22-28, 29A, 29B, 30, 31A, 31B, 32A, 32B and 33 show flow charts for operations of the word processor of the present invention.
Figure 23:
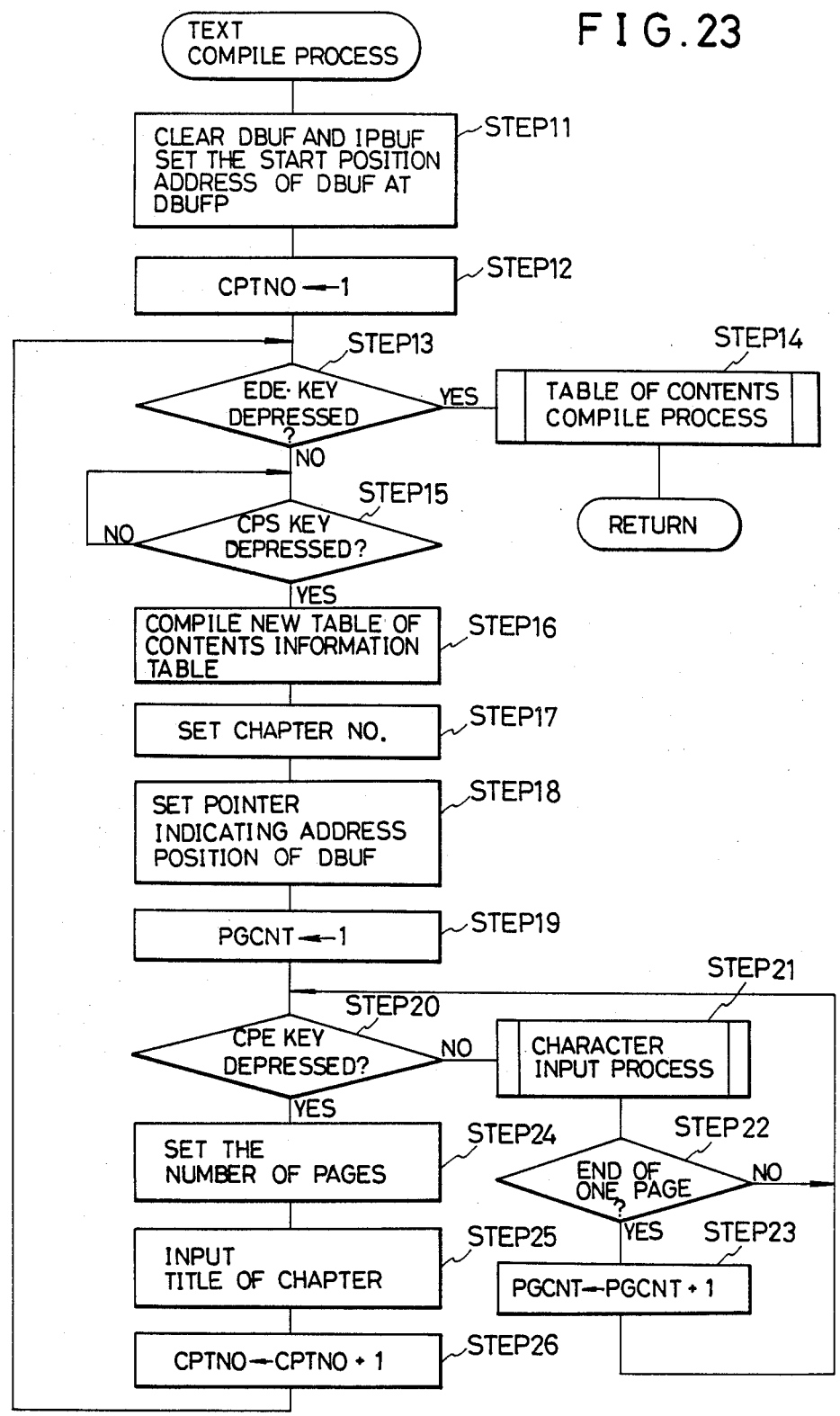
Figure 24:
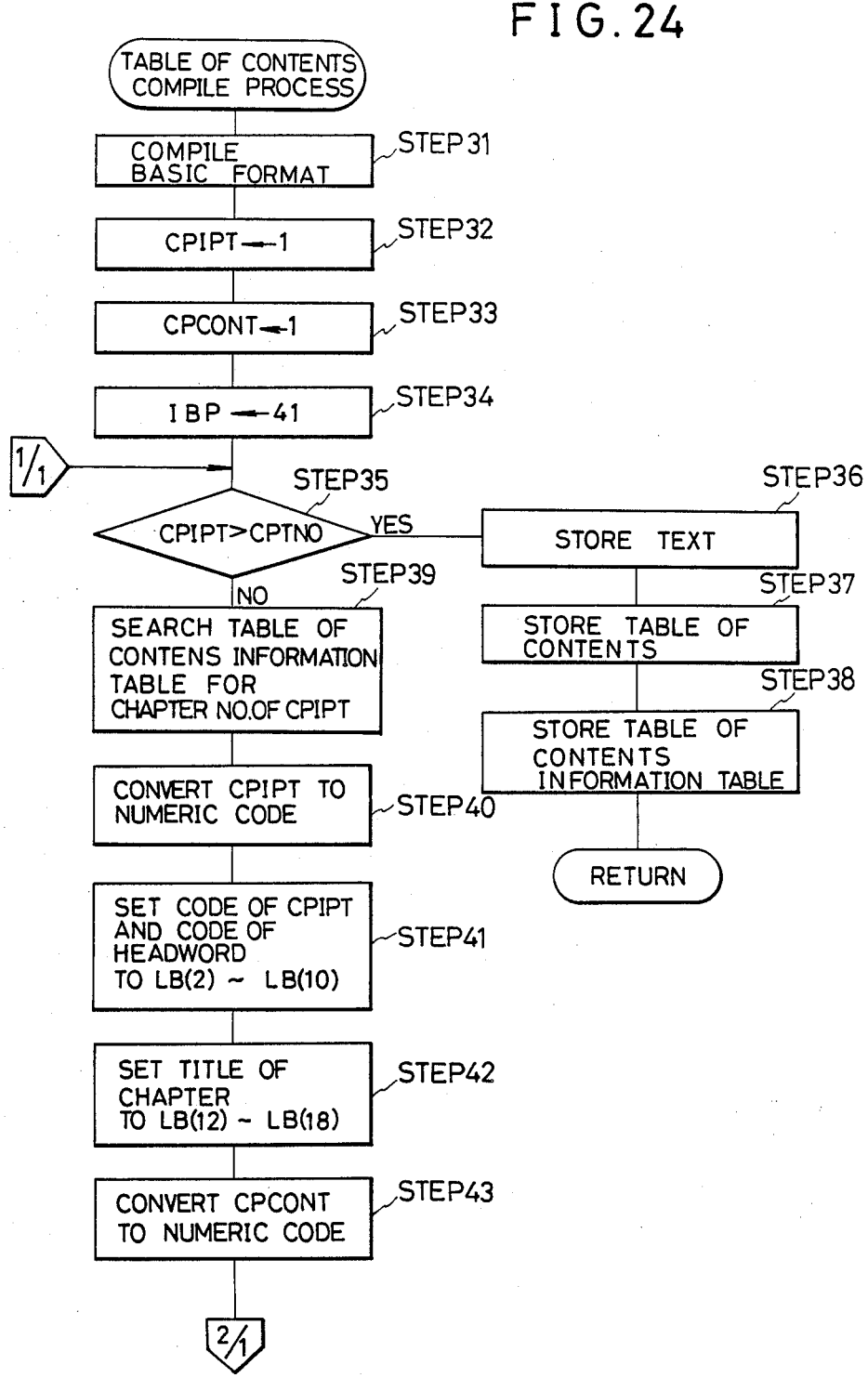
Figure 25:
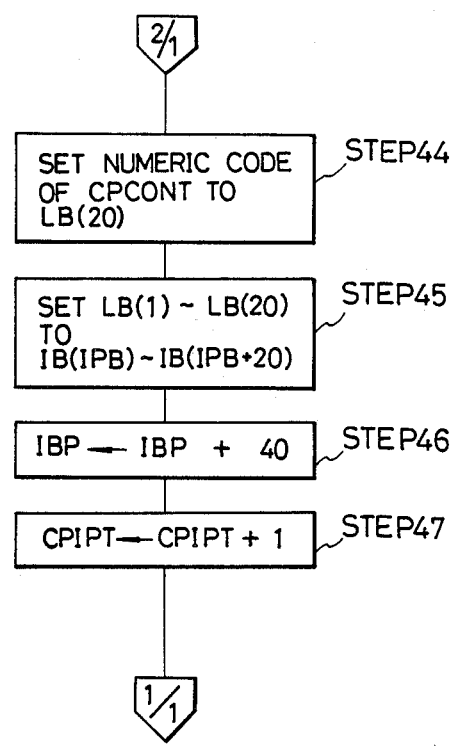
Figure 26:
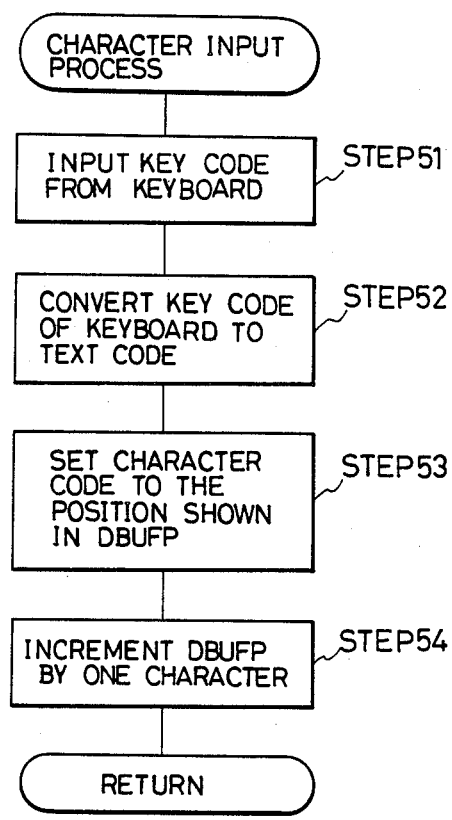

FIGS. 22-33 show flow charts for control procedures of the word processor of FIG. 1. FIG. 22 shows steps for the text compile process and the text reedition process, FIG. 23 shows steps for the text compilation, FIGS. 24, 25 and 26 show steps for compiling the table of contents in accordance with the table of contents information table, and FIGS. 27-33 show steps for reedition process for the compiled text. STEP1-STEP 135 denote steps in the flow charts.

The operation of the word processor of the present invention shown in FIG. 1 is now explained in detail with reference to the flow charts of FIGS. 22-33.

In the present embodiment, two functions, a new text compiling function and a reedition function for the compiled text are provided. Those functions are started by the depression of the text compilation start designation key ED or the reedition designation key RE (see FIG. 5). In FIG. 22, when the text compilation start key ED is depressed (STEP 1), a new text compiling process is started (STEP 2), and when the reedition designation key RE is depressed (STEP 3), the reedition process for the compiled sentence is started (STEP 4).

When the text compile start key ED is depressed, a text compile routine is started and the steps shown in FIG. 23 are executed. Prior to the compilation of a new text, the text compilation buffer DBUF and the table of contents information buffer IPBUF are cleared and a start address of the buffer DBUF is set in the pointer DBUFP (STEP 11). nn initial value of "1" is set in the chapter number register CPTNO which indicates the chapter number (STEP 12). The chapter number register CPTNO is incremented by one each time one chapter has been compiled so that it holds the chapter number of the chapter under compilation. The depression of the end of text compilation designation key EDE which commands the end of the text compilation is checked (STEP 13). If the key EDE is depressed, it indicates the end ff the text compilation, and the table of contents compile routine is started to compile the table of contents (STEP 14). The detail of the table of contents compilation is shown in the flow charts of FIGS. 24-26.

When the end of text compilation designation key EDE is not depressed, the depression of the beginning of chapter designation key CPS which designates the beginning of the chapter is checked (STEP 15). Since the key CPS is always depressed at the beginning of the chapter, the table of contents information table for the new chapter is additionally compieed when the key CPS is depressed (STEP 16). The table of contents information table has the content shown in FIG. 1A. In the STEP 16, an area necessary for the table of contents information table is secured in the table of contents data buffer IPBUF, and the chapter number of the current chapter stored in the chapter number register CPTNO is set in the table of contents information table (STEP 17). A pointer which points to the address in the text buffer DBUF corresponding to the current chapter number of the text is set in the table of contents information table (STEP 18). The pointer for pointing to the address of the buffer DBUF is stored in the pointer DBUFP and it is updated in a STEP 23 after a key entry process (STEP 21) for inputting characters to the text buffer DBUF. This is illustrated in FIG. 11 in which pointers for pointing the start positions of the chapters in the text buffer DBUF from the table of contents information table for the chapters in the table of contents data buffer IPBUF are shown by arrows. An initial value of "1" is set in the page count register PGCNT (STEP 19).

The depression of the end of chapter designation key CPE for designating the end of the chapter is checked (STEP 20). Before the key CPE is depressed, the characters for the chapter may be entered. Thus, if the key CPE is not depressed, the key inputs from the keyboard KB are processed. The key inputs from the keyboard KB are processed by the keyboard controller KBC and the codes corresponding to the depressed keys of the keyboard KB are stored in the text buffer DBUF. In the STEP 21, one character of key input is processed and one character code is set in the text buffer DBUF. The details of the character entry process are shown in the flow chart of FIG. 26. At the end of one character of key input, it is determined if one page of character inputs have been completed (STEP 22). The completion of one page of character inputs is determined in accordance with the number of characters or the number of lines. If one page of character inputs have not been completed, the STEP 20 is repeated, and if the key CPE is not depressed, the similar key entry process to that described above is repeated in the STEP 21. If one page of key inputs have been completed, the content of the page count register PGCNT is incremented by one (STEP 23) and the step 20 is repeated and the key input process of the STEP 21 and the increment process of the STEP 23 are repeated until the key CPE is depressed.

When the end of chapter designation key CPE is depeessed, the number of pages of the current chapter stored in the page count register PGCNT is set at the number of page area of the table of contents information table for the current chapter (STEP 24). Then, the title of the chapter of the table of contents information table is inputted. The title of the chapter is inputted by the keyboard KB as the text is done, and the codes corresponding to the depressed keys are inputted to the title of chapter area of the table of contents information table for the current chapter (STEP 25). In the present embodiment, up to five characters are used as the title of the chapter. Then, the content of the chapter number register CPTNO which stores the chapter number is incremented by one (STEP 26), and the STEP 13 is repeated and the STEPs 15-26 are repeated until the end of text compilation designation key EDE is depressed. In FIG. 11, the steps have been executed to the STEP 26 so that the chapters 1 and 2 have been inputted. By repeating the above text compile process, the full text is compiled as shown in FIG. 12. After the text buffer DBUF and the table of contents data buffer IPBUF shown in FIG. 12 have been compiled, the end of text compilation designation key EDE is depressed.

When the end of text compilation designation key EDE is depressed, the table of contents compile process shown in FIGS. 24 and 25 is started to compile the table of contents basic format shown in FIGS. 13 and 14 in the table of contents buffer IB. The character codes corresponding to the "Table of Contents" are set at the addresses IB(3) to IB(19) on the table of contents buffer IB as the basic format of the table of contents (STEP 31). Then, the initial chapter number "1" representing the chapter 1 is set in the register CPIPT which indicates the chapter number of the chapter being processed (STEP 32) Then, the start page number "1" of the chapter 1 is set in the register CPCONT which indicates the start page of the chapter (STEP 33). Then, the address "41? indicating the address IB(41) of the position of the table of contents for the chapter 1 is set in the register IPB which incicates the character set position of the chapter on the table of contents buffer IB (STEP 34).

Next, the content of the register CPTNO which stores all of the chapter numbers of the text and the content of the register CPIPT which indicates the chapter number of the chapter being processed are compared (STEP 35). When the content of the register CPIPT is larger than the content of the register CPTNO, it indicates that the table of contents compile process has been terminated, and the data, text, table of contents and table of contents information table are stored in STEPs 36-38. In the STEPs 36-38, the contents of the buffers DBUF, IB and IPBUF are transferred to the disk DISK.

If the content of the register CPIPT is smaller than or equal to the content of the register CPTNO, a STEP 39 is executed and the table of contents data corresponding to the chapters of the text are generated and they are transferred to the table of contents buffer IB in the subsequent steps. The table of contents information table corresponding to the chapter number stored in the register CPIPT is retrieved from the table of contents data buffer IPBUF. The table having the chapter number at the start position of the table of contents information table, which corresponds to the content of the register CPIPT is retrieved (STEP 39). By searching the position of the table, the table of contents to be compiled for the chapter is identified. In order to set the chapter number in the table of contents, the content of the chapter number register CPIPT of the chapter being processed is converted to a numeric code (STEP 40). The converted code indicating the chapter number and the character codes for "Chapter" to be combined therewith are set in the data buffer for one chapter (table of contents one-line buffer) LB (STEP 41). In the example shown in FIG. 17, the codes for "chapter" are stored at the addresses LB(2)-LB(8) and the code for "1" is stored at the address LB(10).

Then, the title of the chapter is set in the table of contents one-line buffer LB. The title of the chapter is stored in the table of contents information table of the chapter being processed, in the form of character codes. The character codes for the title of the chapter in the table of contents infommation table are set at the address LB(12)-LB(18) of the buffer LB (STEP 42).

Then, the start page of the character stored in the register CPCONT which indicates the start page of the chapter being processed is converted to a numeric code (STEP 43). The numeric code is set at the address LB(20) of the buffer LB in the form of ccharacter code (STEP 44). Through the STEPs 39-44, the table of contents of the chapter indicated by the register CPIPT is set in the one-line table of contents buffer LB having the table of contents data area for one chapter as shown in FIG. 17. When the content of the register CPIPT is "1" and the chapter 1 is processed, the table of contents shown in FIG. 17 is compiled.

The table of contents data for one chapter just compiled is transferred to the table of contents buffer IB. In the present embodiment, the data areas in the buffer IB are at the addresses IB(41)-IB(60), IB(81)-IB(100), IB(121)-IB(140), IB(161)-IB(180) and IB(201)-IB(220). Thus, the contents of the addresses LB(1)-LB(20) of the buffer LB are set at the addresses of the table of contents buffer IB indicated by the table of contents buffer address register IBP, that is, at the addresses IB(IBP)-IB(IBP+20) (STEP 45). FIG. 18 shows the table of contents data which was transferred from the table of contents one-line buffer LB for the chapter 1 to the addresses IB(41)-IB(60) of the table of contents buffer IB Then, the content of the table of contents buffer address register IBP is incremented yy "40"0 to set the address at which the next table of contents data is to be set (STEP 46). Then, the content of the register CPIPT which indicates the chapter number of the chapter being processed is incremented by one to indicate the chapter number of the next chapter (STEP 47). In this manner, the table of contents for one chapter is set in the table of contents buffer and the register is set for the next chapter. Then, the STEP 35 is executed again and the STEPs 35-47 are repeated until the content of the register CPIPT exceeds the content of the register CPTNO. By the repetitive execution of the STEPs 35-47, the table of contents for all chapters are set in the table of contents buffer IB. FIG. 16 shows the table of contents buffer IB having the table of contents data for all chapters stored therein. After the table of contents compile process, the text compile process is terminated and the control is returned to the main routine of FIG. 2.

The character input process of FIG. 26 is now explained. Key codes are inputted from the keyboard KB (STEP 51). The key codes inputted from the keyboard KB are converted to text character codes (STEP 52). The converted character code is set at the address of the buffer indicated by the register DBUFP which indicates the current input address of the text buffer DBUF (STEP 53). Through the STEPs 51-53, one character code is set in the text buffer DBUF. Then, the content of the register DBUF is incremented by one character to indicate the next character input address (STEP 54). Then, the main routine for the text compile process shown in FIG. 23 is started and the STEP 22 is executed.

In this manner, through the steps shown in FIGS. 23-26, the table of contents is automatically compiled in the table of contents buffer IB when the end of the text compilation is indicated, in accordance with the table of contents information table compiled during the compilation of the text.

When the print designation key PK is depressed, the contents of the table of contents buffer IB and the text buffer DBUF are sequentially read out and printed out by the printer PRT.

The function of reedition of the text by using the text, the table of contents and the table of contents information table compiled by the text compile function described above is now explained with reference to the flow charts of FIGS. 27-33.

Figure 27:
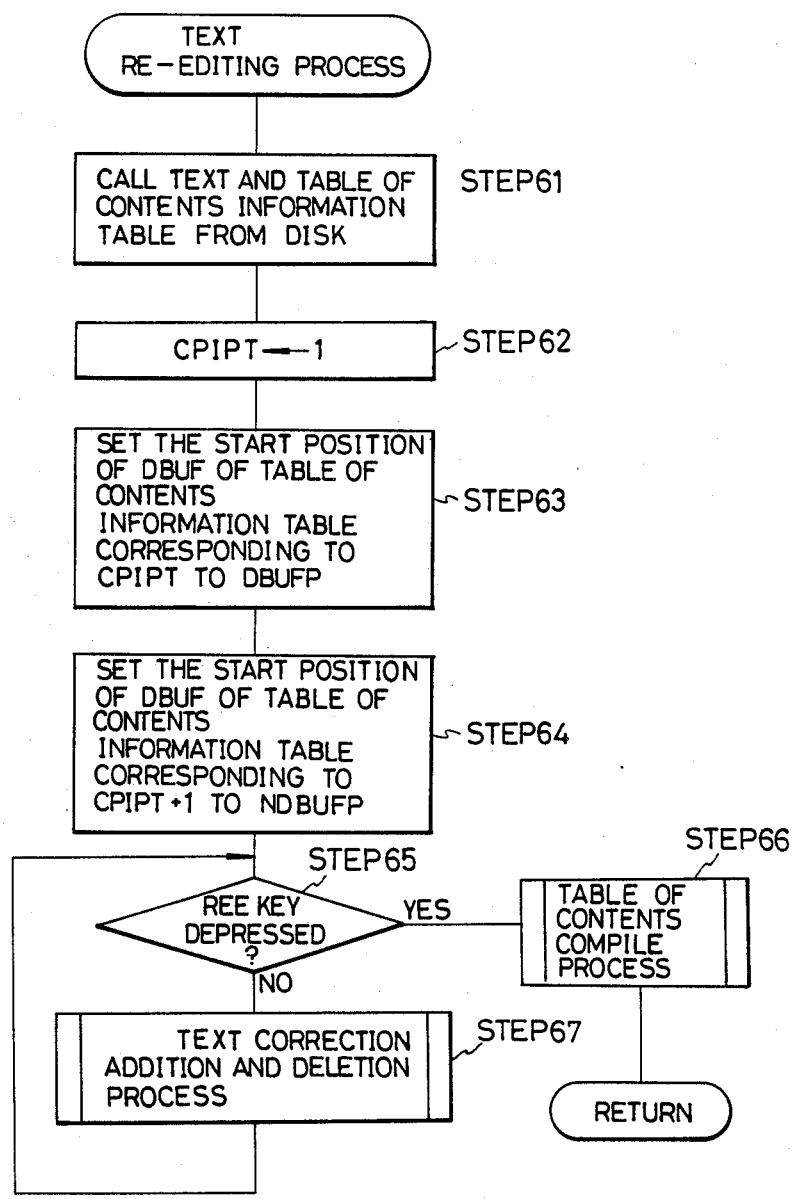
Figure 28:
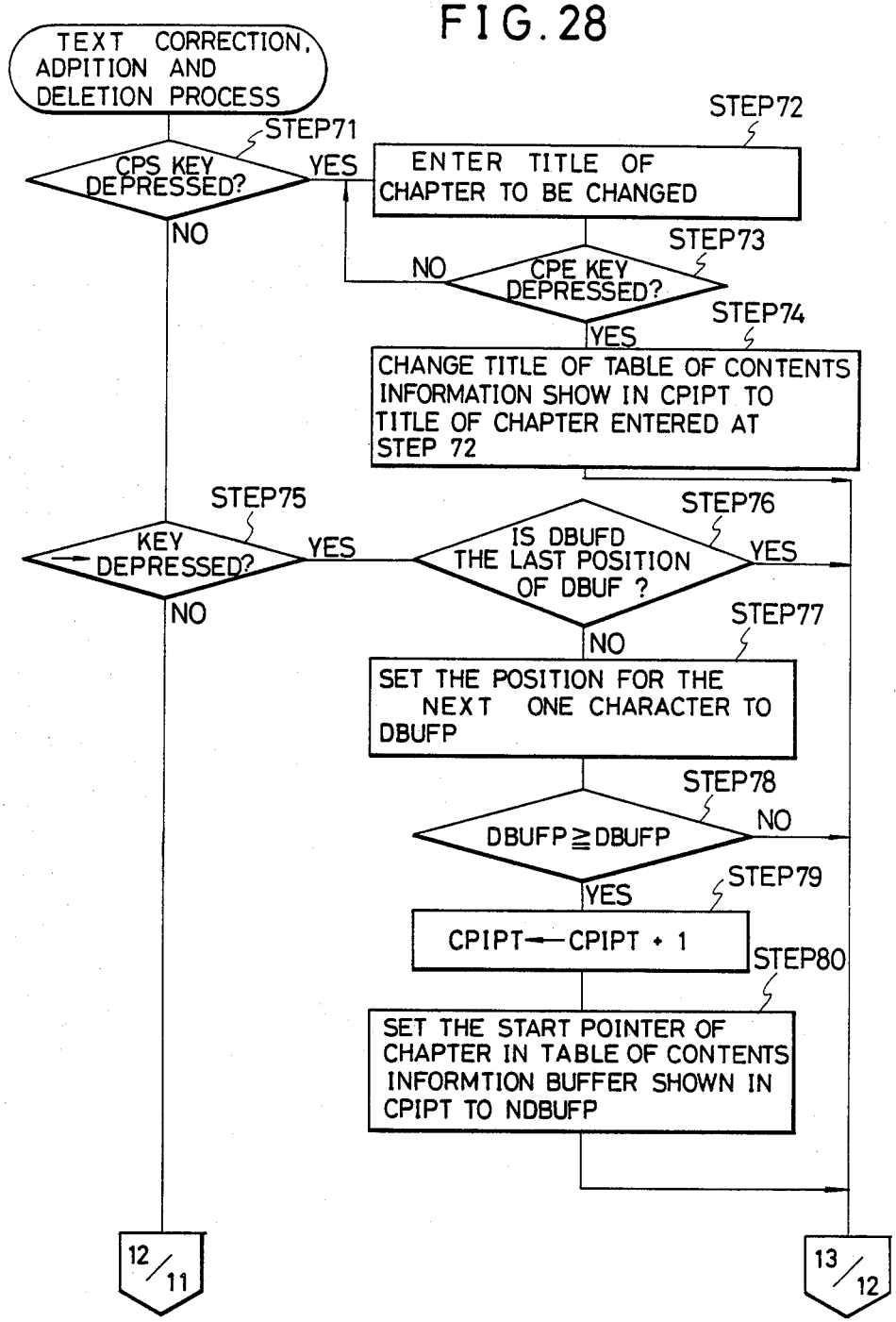

When the reedition designation key RE is depressed, the text reedition routine shown in FIG. 27 is started to execute the text reedition process. The text, the table of contents and the table of contents information table compiled in the text compile process are read from the disk DISK and set in the random access memory RAM. The text is set in the text buffer DBUF, the table of contents information table is set in the table of contents data buffer IPBUF, and the table of contents data is set in the table of contents buffer IB in the same manner as in the text compile process (STEP 61).

Then, "1" indicating the chapter 1 is set in the register CPIPT which indicates the chapter number of the chapter being processed (STEP 62), and the pointer (address) which points the start address of the chapter in the table of contents information table corresponding to the chapter number stored in the register CPIPT is set to the register DBUFP which indicates the address of the text buffer DBUF being processed (STEP 63). Through the STEP 63, the start address of the text buffer DBUF is set. Then, the pointer which points the start address of the chapter in the table of contents information table corresponding to the next chapter number to the chapter number stored in the register CPIPT is set in the register NDBUFP which indicates the next chapter address of the text buffer DBUF (STEP 64). The register NDBUFP is used to check if the pointer DBUFP to the text buffer DBUF being processed has been moved to the next chapter address or not in a STEP 78.

Then, the depression of the end of reedition designation key REE is checked (STEP 65). When the key REE is depressed, it indicates that the correction, addition or deletion of the text has been completed, and the table of contents compile routine is started to execute the table of contents compile process (STEP 66). The table of contents compile process is similar to the text compile process explained in FIGS. 24 and 25. A new table of contents is compiled in the table of contents buffer IB and the disk DISK in accordance with the table of contents information table compiled in the reedition process such as the correction of the text. When the table of contents compile process is completed, the reedition process is terminated and the control is returned to the main routine of FIG. 22. When a key other than the end of reedition designation key REE is depressed, the correction, addition and/or deletion processes shown in FIGS. 28-33 are executed (STEP 67). The STEP 67 is repeatedly executed until the key REE is depressed.

In the text correction, addition and deletion process, the depression of the start of chapter designation key CPS is checked (STEP 71). When the key CPS is depressed, the title to be changed is keyed until the end of chapter designation key CPE is depressed to change the title of the chapter being processed (STEP 72 and STEP 73). When the end of chapter designation key CPE is depressed, the title of the chapter having the chapter number corresponding to the content of the register CPIPT which indicates the chapter number of the chapter being processed is substituted for the title of the new chapter just inputted (STEP 74). After the execution of the STEPs 72-74, the correction, addition and deletion process is terminated and the control is returned to the main routine of FIG. 27.

When a key other than the start of chapter designation key CPS is depressed, the depression of the pointer advance key PA with a mark "→" is checked (STEP 75). When it is depressed, it is checked if the current address of the text buffer DBUF is the last address of the text buffer DBUF or not based on the content of the text buffer pointer DBUFP (STEP 76). If it is the last address, nothing is executed and the correction, addition and deletion process is terminated, and the control is returned to the main routine of FIG. 27. When the address pointed by the pointer DBUFP is not the last address of the text buffer DBUF, the content of the pointer DBUFP is set to the next character position (STEP 77).

The content of the text buffer pointer DBUFP just changed is compared with the content of the register NDBUFP which indicates the start address of the next chapter to determine if the content of the text buffer pointer DBUFP has reached the start address of the next chapter (STEP 78). If the content of the text buffer pointer DBUFP has not reached the start address of the next chapter, the process to advance the text buffer pointer DBUFP by one character address is terminated, the correction, addition and deletion process is terminated, and the control is returned to the main routine of FIG. 27. When the content of the pointer DBUFP reaches the start address of the next chapter, the process is shifted to the next chapter. Thus, the content of the register CPIPT which indicates the chapter number of the chapter being processed is incremented by one to indicate the next chapter number (STEP 79). Then, the content of the register CPIPT is transferred to the register NDBUFP which indicates the start address of the next chapter to set the start address again (STEP 80). After the STEP 80, the correction, addition and deletion process is terminated and the control is returned to the main routine of FIG. 27.

Figure 29A:
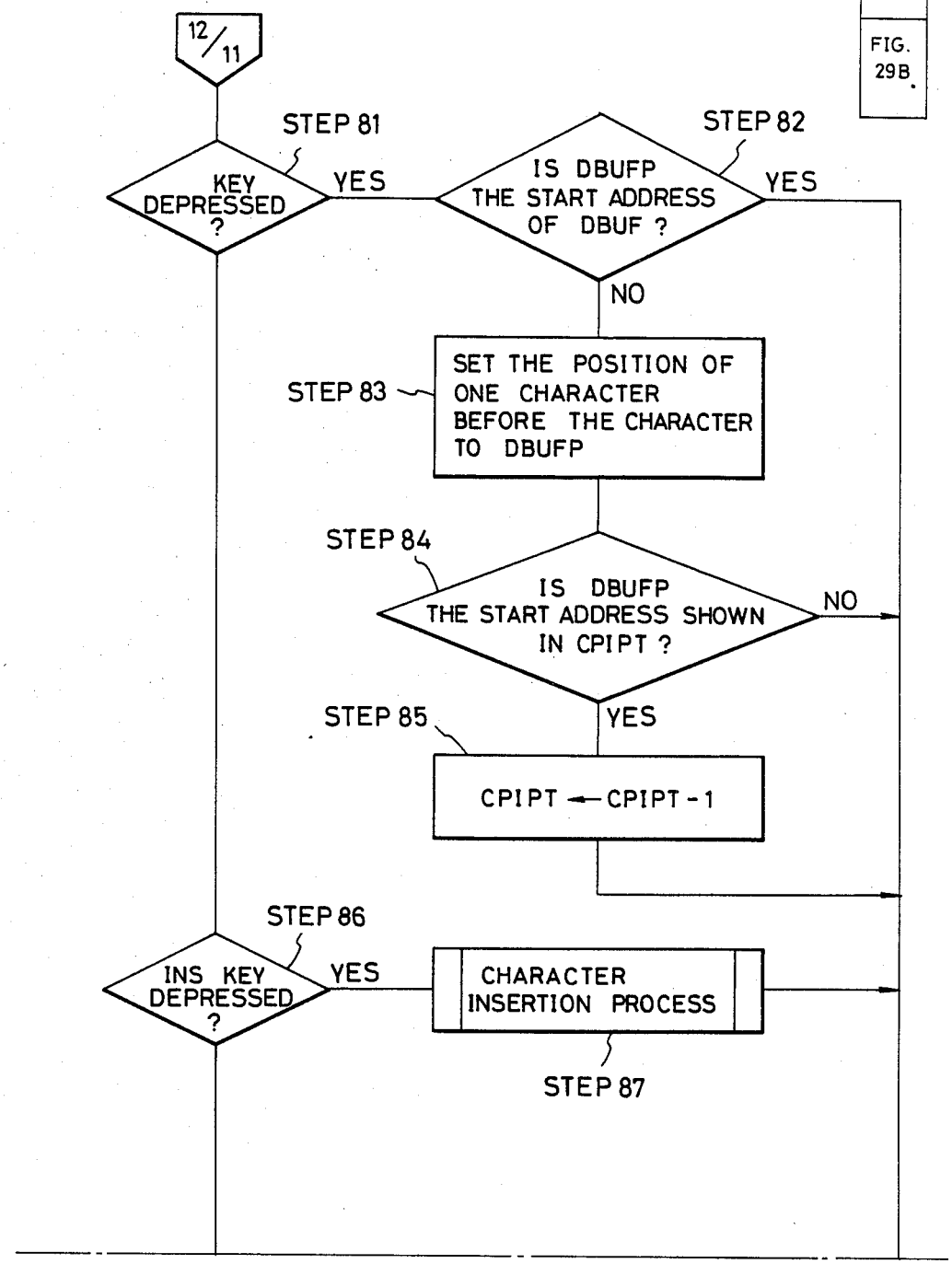
Figure 29B:
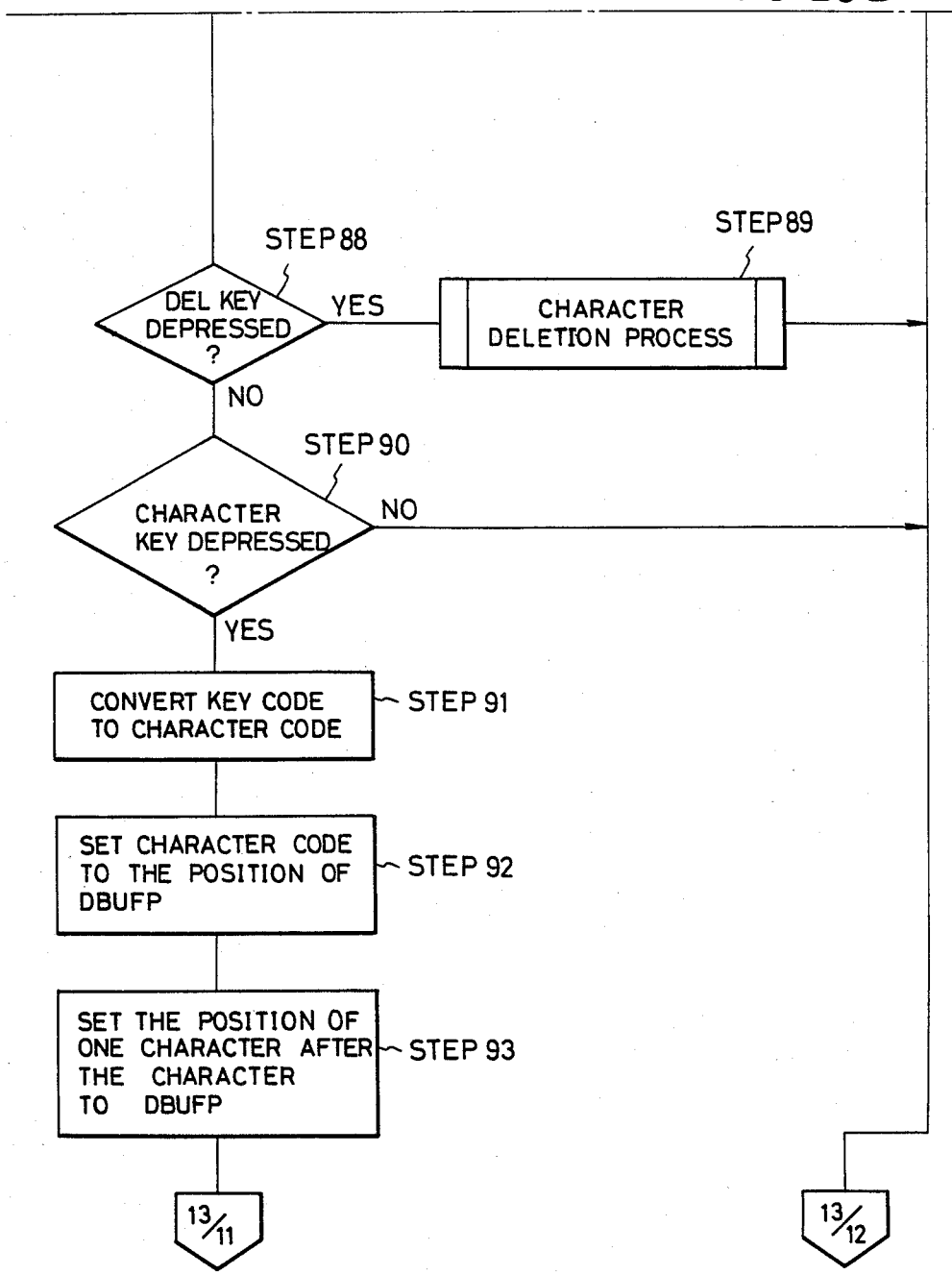
Figure 30:
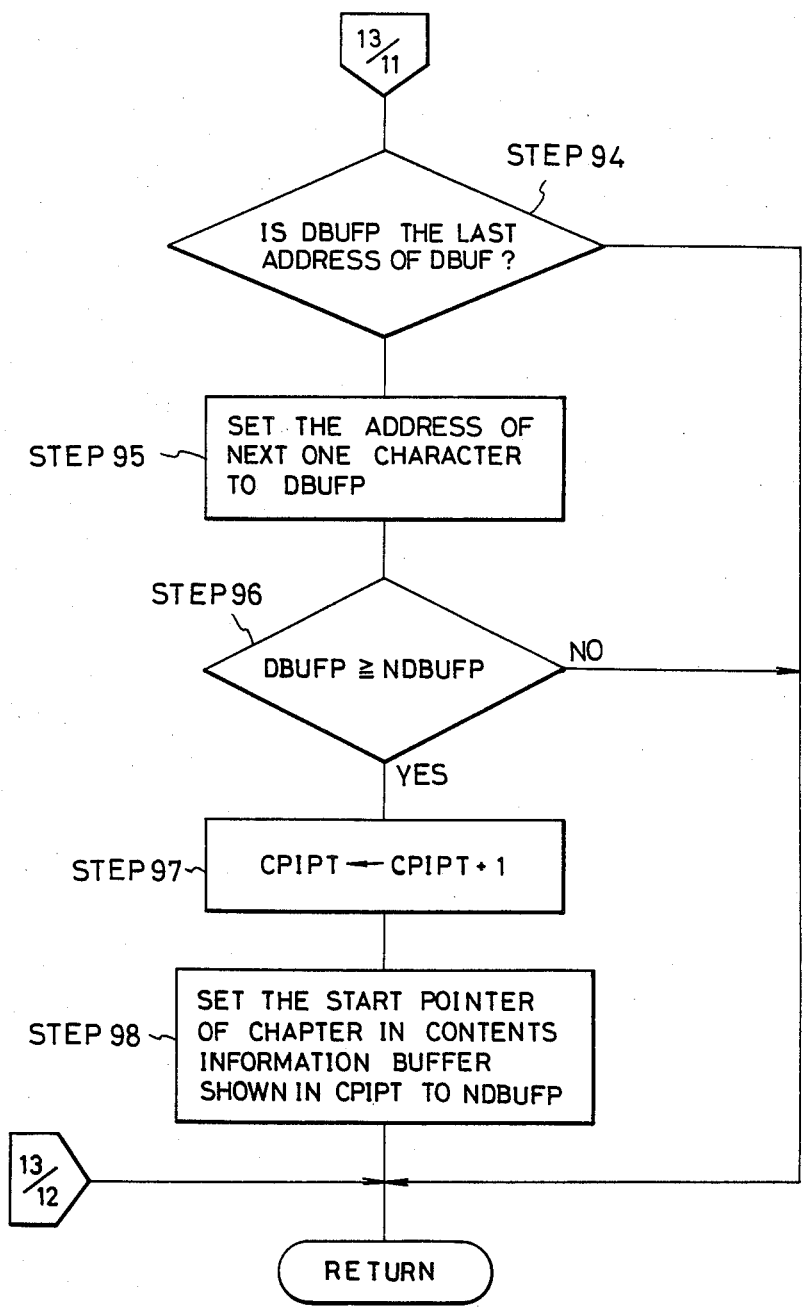

In the STEP 75, if a key other than the pointer advance key PA is depressed, a STEP 81 of FIG. 29 is started to check the depression of the pointer retract key PB with a mark "←". If the key PB is depressed, it is checked if the content of the text buffer pointer DBUFP points to the start address of the text buffer DBUF or not (STEP 82). When the content of the pointer DBUFP points to the start address of the text buffer DBUF, nothing is executed and the correction, addition and deletion process is terminated and the control is retureed to the main routine of FIG. 27. If the content of the pointer DBUFP does not point to the start address of the text buffer DBUF, the character position which is one character before is set in the pointer DBUFP (STEP 83). The content of the pointer DBUFP is then compared with the content of the register CPIPT to check if the content of the pointer DBUFP has reached the start address of the chapter being processed (STEP 84). If the content of the pointer DBUFP does not point to the start address of the chapter being processed, the correction, addition and deletion process is terminated and the control is returned to the main routine of FIG. 27. When the address pointed by the pointer DBUFP reaches the start address of the chapter being processed, the chapter number in the register CPIPT is decremented by one to shift the process to the immediately previous chapter (STEP 85), and the correction, addition and deletion process is terminated and the control is returned to the main routine of FIG. 27.

Figure 31A:
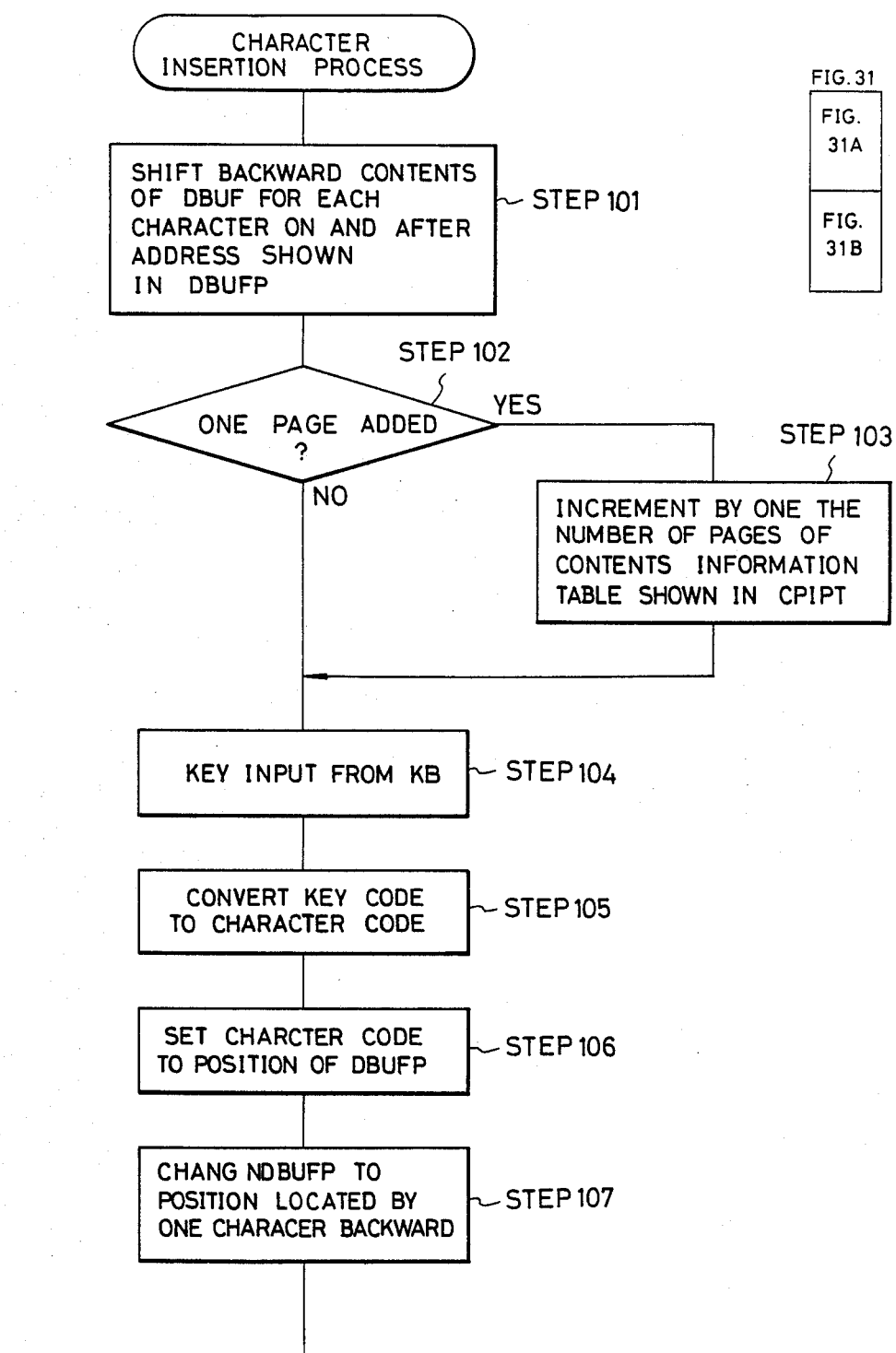
Figure 31B:
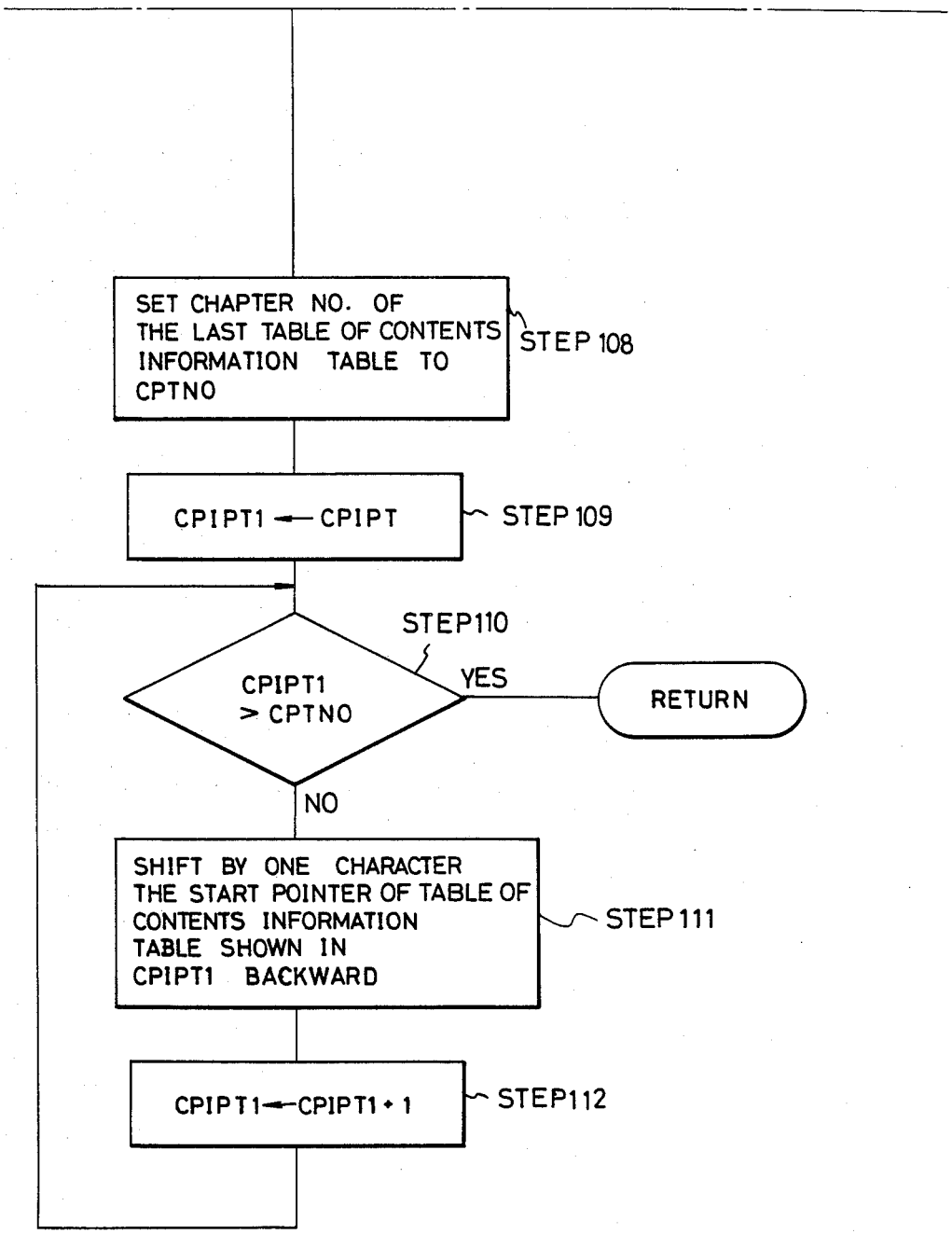
Figure 32A:
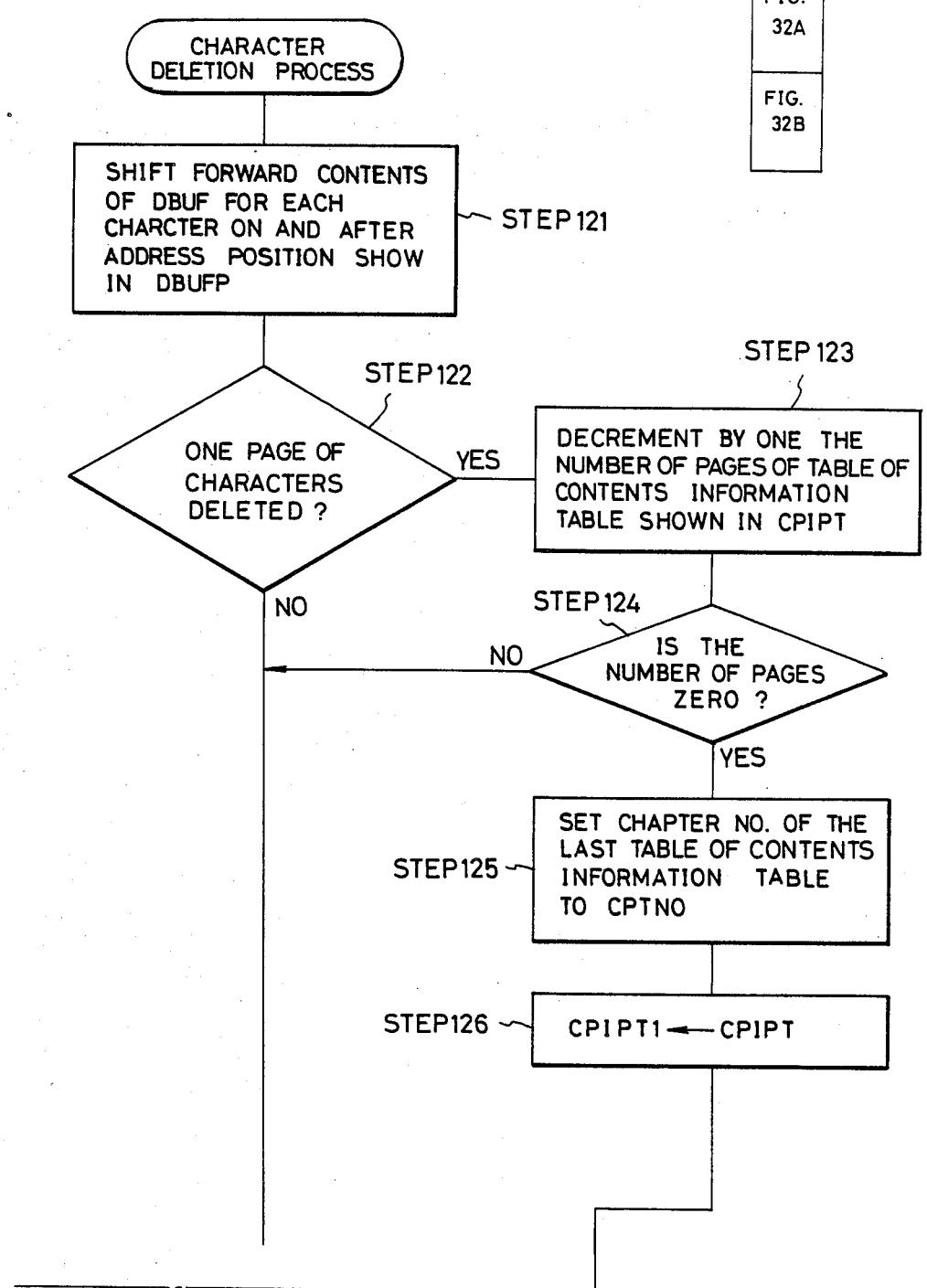
Figure 32B:
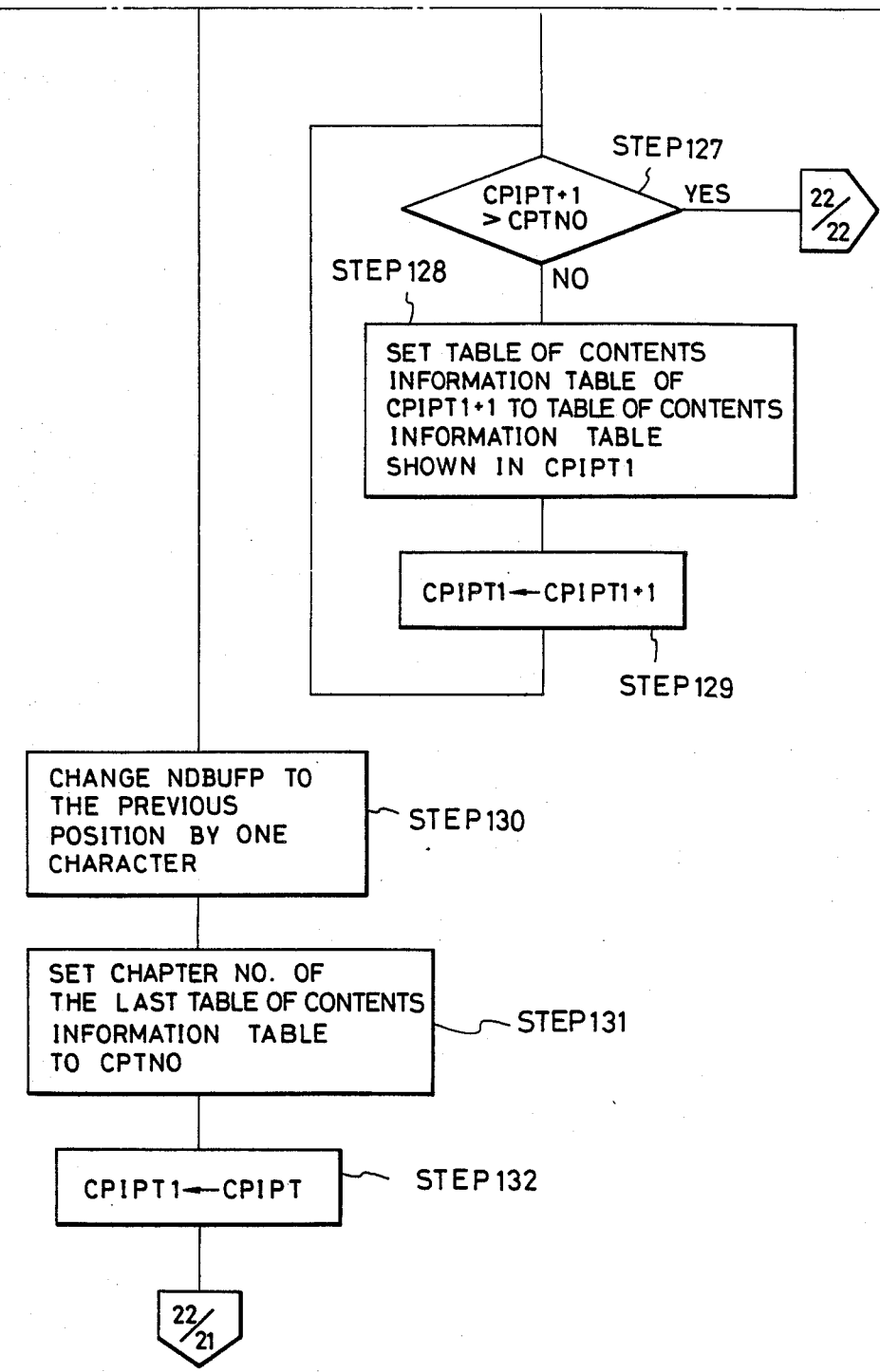
Figure 33:
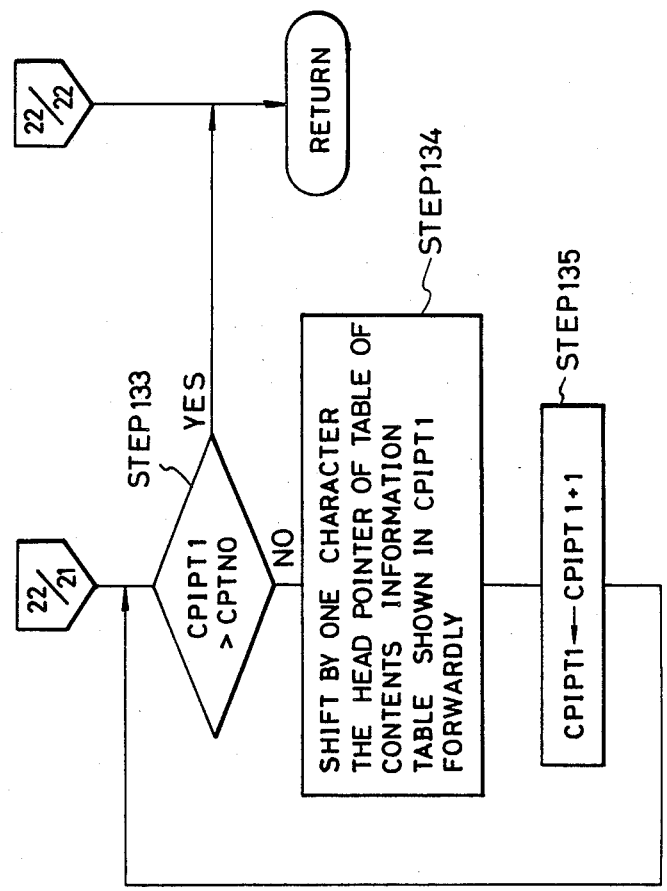

When a key other than the pointer retract key PB is depressed, the depression of the key INS for commanding one character insertion is checked (STEP 86). If the key INS is depressed, a character insertion process shown in FIG. 31 is executed (STEP 87). If the key other than the key INS is depressed, the depression of the key DEL for commanding one character deletion is checked (STEP 88). If the key DEL is depressed, a character deletion process shown in FIGS. 32 and 33 is executed (STEP 89).

When a key other than the one character deletion key DEL is depressed, the depression of the character key KB1 is checked (STEP 90). When a key other than the character key KB1 is depressed, the correction, addition and deletion process is terminated and the control is returned to the main routine of FIG. 22. When the character key KB1 is dppressed, the key code of that key is converted to a character code of the text (STEP 91). The character code converted in the STEP 91 is set at the address of the text buffer DBUF pointed by the text buffer pointer DBUFP (STEP 92).

A character address which is one address advance is set in the pointer DBUFP (STEP 93). In STEPs 94-98, the same process as that in the STEPs 76-8 is executed. In the STEP 94, it is checked if the content of the pointer DBUFP points to the last address of the buffer DBUF, and if it is the last address, the process is terminated. If it is not the last address, the content of the pointer DBUFP is incremented by one character address in the STEP 95. In the STEP 96, it is checked if the content of the pointer DBUFP has reached the start address of the next chapter, and if it has not, the process to advance to the next character is terminated, and if the content of the pointer DBUFP has reached the start address of the next chapter, the content of the register CPIPT which indicates the chapter number of the chapter being processed is incremented by one in the STEP 97, the start address of the next chapter is set in the register NDBUFP in the STEP 98, and the process is terminated and the control is returned to the main routine of FIG. 27.

The character insertion process is now explained with reference to FIG. 31. In the character insertion process, the content of the buffer DBUF at the addresses following to the address pointed by the pointer DBUFP is moved one character position behind (STEP 101). It is checked if the number of pages of the chapter pointed by the register CPIPT has been increased by one by the character insertion process of the STEP 101 (STEP 102). If the number of pages has been increased, the number of pages in the table of contents information table pointed by the register CPPPT is incremented by one (STEP 103). The key input of the character to be inserted, inputted from the keyboard KB is processed (STEP 104). The keycode is then converted to the character code (STEP 105). The character code converted in the STEP 105 is set at the address of the buffer DBUF pointed by the pointer DBUFP (STEP 106). The content of the register NDBUFP is changed to indicate the one character behind address (STEP 107). The chapter number of the last table of contents information table is retrieved from the buffer IPBUF and set in the CPTNO (STEP 108), and the chapter number of the chapter being processed and indicated by the CPIPT is set in the register CPIPT1 (STEP 109). Then, it is checked if the process to all chapters has been completed (STEP 110). If it has been completed, the process is terminated and the control is returned to the routine of FIG. 29. If the process for all chapters has not been completed, the head pointer of the table of contents information table indicated by the regsster CPIPT1 is shifted one character behind (STEP 111). Then, the content of the register CPIPT1 is incremented by one to indicate the next chapter number (STEP 112) and then the STEP 110 is executed again. The STEPs 110-112 are repeated to change the head pointers for all chapters.

The character deletion process is now explained with reference to FIGS. 32 and 33. In the character deletion process, the content of the text buffer DBUF at the addresses following to the address pointed by the pointer DBUFP is shifted one character ahead (STEP 121). It is checked if one page of characters have been deleted (STEP 122). If one page of characters has been deleted, the number of pages in the table of contents information table indicated by the register CPIPT is decremented by one (STEP 123). It is checked if the number of pages decremented by one in the STEP 123 is zero or not (STEP 124). If the number of pages is zero in the STEP 124, the chapter number of the last table of contents information table is set in the register CPTNO (STEP 125), and the content of the register CPIPT is set in the register CPIPT1 (STEP 126). Then, the content of the register CPTNO is compared with the content of the register CPIPT to check whether the process for all chapters has been completed or not (STEP 127). If it has been completed, the character deletion process is terminated and the control is returned to the routine of FIG. 27. If the process for all chapters has not been completed, the table of contents information table for the chapter number indicated by the content of the register CPIPT plus one (i.e. CPIPT1+1) is set in the area of the table of contents information table for the chapter number indicated by the register CPIPT1 (STEP 128). Then, the content of the register CPIPT1 is incremented by one to set the next chapter number (STEP 129), and the process returns to the STEP 127 and the STEPs 127-129 are repeated until the process for all chapters is completed. By repeating the STEPs 127-129, the table of contents information table for one chapter is deleted.

If one page deletion is not detected in the STEP 122, the content of the register NDBUFP is changed to the one character before address of the buffer DBUF (STEP 130). In STEP 131 and STEP 132, the similar process to that in the STEP 125 and the STEP 126 is executed to set the chapter number of the last table of contents information table in the register CPTNO and set the content of the register CPIPT in the register CPIPT1. Then, it is checked if the process for all chapters has been completed (STEP 133). If it has been completed, the character deletion process is terminated and the control is returned to the routine of FIG. 27. If the process for all chapters has not been completed, the head pointer of the table of contents information table indicated by the register CPIPT1 is shifted one character ahead (STEP 134). Then, the next chapter number is set in the register CPIPT1 (STEP 135) and the process returns to the STEP 133 and the STEP 133-STEP 135 are repeated until the process for all chapters is completed and the process to shift the head pointers for all chapters one character ahead is terminated.

FIG. 19 shows the example of the text in the buffer DBUF corrected by the reedition process. In this example, the chapter 1 which first comprised one page has two pages by the addition of one page of text, and the chapter 4 which first contained "Notes" is deleted in the reedition process, and the chapter 5 which first contained "closing" is changed to chapter 4. Accordingly, in the table of contents information table (IPBUF) shown in FIG. 19, the chapters 1, 4 and 5 need be amended or corrected by the correction and the addition of the text. By the addition of one page of text to the chapter 1, the number of pages "1" for the chapter number "1" of the table of contents information table is changed to "2" By the deletion of the chapter 4, the table of contents information table for the chapter 4 is deleted and the former chapter number "5" for the original chapter 5 is changed to "4" during the execution of the text correction process. When the end of reedition designation key REE is depressed, the table of contents information table is compiled so that the text and the table of contents information table are compiled as shown in FIG. 19. Thereafter, the table of contents shown in FIG. 20 is outputted by the printer PRT. In this manner, in the present embodiment, the table of contents and the table of contents information table are automatically corrected and stored as the text is corrected.

In the present embodiment, the designation keys CPS and CPE of the keyboard KB are used to designate the beginning and the end of the chapter. The designation keys CPS and CPE may be eliminated by inputting key words of the text by the conventional character keys. For example, the key word may be inputted with a title of the chapter so that a load to depress the designation key is eliminated.

In the present embodiment, the table of contents data for the chapter is limited to the number of pages and the title of the chapter. However, other necessary information may be added. While the text and the chapters as the divisional units of the text are used in the present embodiment, paragraphs for the chapters as sub-divisional units may be used and the similar effect is attained. Since the text in the present invention is constructed by the edition units and the aggregation of the units, the process of the present invention can be executed over any number of levels.

As described hereinabove, in accordance with the present invention, the table of contents is automatically compiled as the text is compiled and a separate work for compiling the table of contents is not required.

Since the table of cottents is automatically corrected or modified as the text is corrected or modified, the correction or modification of only the text is needed and a work for correcting or modifying the table of contents is not necessary.

What is claimed is:

1. A method of processing text comprising the steps of:
inputting a plurality of characters into a word processor;
compiling a text including chapters or paragraphs from the inputted characters and designating boundaries between the chapters or paragraphs of the compiled text;

storing the compiled text in a memory; and reading the compiled text from the memory and compiling a table of contents from the read, compiled text, wherein the table of contents comprises a plurality of titles each corresponding to one of the chapters or paragraphs of the text stored in the memory, wherein said step of compiling the table of contents comprises the step of compiling each title of the table of contents from the contents of its corresponding chapter or paragraph.

2. The method defined by claim 1 further comprising the step of displaying the text and the table of contents.

3. The method defined by claim 1 further comprising the step of designating the start of compiling the text, wherein said table of contents compiling step further comprises the step of compiling the table of contents in a buffer memory, and wherein said method further comprises the step of clearing the buffer memory in response to the performing of said designating step.

4. The method defined by claim 1 wherein said table of contents compiling step further comprises the step of generating a code representing characters of the table of contents regardless of the contents of the text.

5. The method defined by claim 1 wherein said storing step comprises the step of storing the numbers of all of the chapters of the text and storing the number of the chapter currently being processed.

6. The method defined by claim 5 further comprising the step of storing the table of contents in the memory.

7. The method defined by claim 1 wherein said step of deignating boundaries between the chapters or paragraph of the compiled text comprises the step of designating the ends of the chapters or paragraphs.

8. The method defined by claim 1 further comprising the steps of:

storing said plurality of characters in a memory in the word processor before said compiling step; and reading the plurality of characters from the memory storing the plurality of characters before said compiling step, wherein said compiling step comprises the step of compiling a text including chapters or paragraphs from the plurality of characters read from the memory storing the plurality of charactrrs and designating boundaries between the chapters or paragraphs of the compiled text.

9. A method of processing a text comprising the steps of:

inputting a plurality of characters into a word processor;

compiling a text including a plurality of chapters from the inputted characters and compiling a table of contents comprising a plurality of titles each corresponding to one of the chapters, in accordance with the compiled text;

storing the compiled text and the table of contents in a memory; and reading and editing the contents stored in the memory, wherein said reading and editing step comprises the steps of:

editing one of the chapters of the text stored in the memory; and correcting the table of contents by correcting the number of the edited chapter and the number of pages of the edited chapter and by correcting the number of the other chapters and the number of pages of the other chapters, in accordance with the edited text.

10. The method defined in claim 9 further comprising the step of displaying the text and the table of contents.

11. The method defined by claim 9 further comprising the step of designating the start of compiling the text, wherein said table of contents compiling step further comprises the step of compiling the table of contents in a buffer memory, and wherein said method further comprises the step of clearing the buffer memory in response to the performing of said designating step.

12. The method defined by claim 9 wherein said table of contents compiling step further comprises the step of generating a code representing characters of the table of contents regardless of the contents of the text.

13. The method defined by claim 9 wherein said storing step comprises the step of storing the numbers of all of the chapters of the text and storing the number of the chapter currently being processed.

14. The method defined by claim 9 further comprising the step of designating boundaries between the chapters of the compiled text and designating the ends of the chapters.

15. The method defied by claim 9 further comprising the steps of:

storing said plurality of characters in a memory in the word processor before said compiling step; and reading the plurality of characters from the memory storing the plurality of characters before said compiling step, wherein said compiling step comprises the step of compiling a text including a plurality of chapters from the plurality of characters read from the memory storing the plurality of characters and compiling a table of contents comprising of plurality of titles each corresponding to one of the chapters, in accordance with the compiled text.

* * * * *

UNITED STATES PATENT AND TRADEMARK OFFICE
CERTIFICATE OF CORRECTION

PATENT NO. : 4,792,919

DATED : December 20, 1988

INVENTOR(S) : KOUJI FUKUNAGA

Page 1 of 3

It is certified that error appears in the above-identified patent and that said Letters Patent is hereby corrected as shown below:

COLUMN 1
    Line 11, change "text" to --text.--.
    Line 50, change "sentence" to --text--.

COLUMN 2
    Line 8, change "ahd" to --and--.
    Line 20, delete "H;".
    Line 21, change "FIG. 13" to --¶ FIG. 13--.
    Line 39, change "table IPBUF" to --buffer IPBUF--.

COLUMN 3
    Line 20, change "matinn" to --mation".
    Line 22, change "eegister" to --register--.

COLUMN 4
    Line 29, change "duringtthe" to --during the--.
    Line 35, change "a" to --at--.
    Line 37, change "ueed" to --used--.

COLUMN 6
    Line 36, change "for ree-" to --for the ree---.
    Line 58, change "nn" to --An--.
    Line 67, change "ff" to --of--.

UNITED STATES PATENT AND TRADEMARK OFFICE
CERTIFICATE OF CORRECTION

PATENT NO. : 4,792,919

DATED : December 20, 1988

INVENTOR(S) : KOUJI FUKUNAGA

It is certified that error appears in the above-identified patent and that said Letters Patent is hereby corrected as shown below:

COLUMN 7
    Line 9, change "compieed" to --compiled--.
    Line 11, change "FIG. 1A." to --FIG. 10A.--.
    Line 59, change "depeessed," to --depressed,--.

COLUMN 8
    Line 25, change "(STEP 32)" to --(STEP 32).--.
    Line 28, change ""41?" to --"41"--.
    Line 30, change "incicates" to --indicates--.

COLUMN 9
    Line 6, change "infommation" to --information--.
    Line 33, change "IB" to --IB.--.
    Line 34, change "yy "40"0" to --by "40"--.
    Line 52, change "2" to --22--.

COLUMN 11
    Line 58, change "retureed" to --returned--.

COLUMN 12
    Line 33, change "STEPs 76-8" to --STEPs 76-80--.
    Line 61, change "register CPPPT" to --register CPIPT--.

COLUMN 13
    Line 12, change "regsster" to --register--.

UNITED STATES PATENT AND TRADEMARK OFFICE
CERTIFICATE OF CORRECTION

PATENT NO. : 4,792,919

DATED : December 20, 1988

INVENTOR(S) : KOUJI FUKUNAGA

It is certified that error appears in the above-identified patent and that said Letters Patent is hereby corrected as shown below:

COLUMN 14
    Line 57, change "cottents" to --contents--.
    Line 63, change "text" to --a text--.

COLUMN 15
    Line 34, change "graph" to --graphs--.
    Line 46, change "charactrrs" to --characters--.

COLUMN 16
    Line 17, change "defined in" to --defined by--.
    Line 39, change "defied" to --defined--.
    Line 51, change "of" (second occurrence) to --a--.

FIGURE 24
    Step 39, change "CONTENS" to "CONTENTS--.

FIGURE 32
    Step 121, change "CHARCTER" to --CHARACTER--.

Signed and Sealed this

Twenty-seventh Day of November, 1990

Attest:

HARRY F. MANBECK, JR.

*Attesting Officer*    *Commissioner of Patents and Trademarks*